United States Patent
Datema

(10) Patent No.: US 12,330,338 B2
(45) Date of Patent: Jun. 17, 2025

(54) AXLE PRESSURE SETTING SYSTEMS AND METHODS

(71) Applicant: Oshkosh Corporation, Oshkosh, WI (US)

(72) Inventor: Bryan S. Datema, Rochester, MN (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

(21) Appl. No.: 18/384,548

(22) Filed: Oct. 27, 2023

(65) Prior Publication Data

US 2024/0058989 A1    Feb. 22, 2024

Related U.S. Application Data

(63) Continuation of application No. 17/184,100, filed on Feb. 24, 2021, now Pat. No. 11,833,713.

(60) Provisional application No. 62/986,463, filed on Mar. 6, 2020.

(51) Int. Cl.
| | |
|---|---|
| B28C 5/42 | (2006.01) |
| B60C 23/00 | (2006.01) |
| B60P 3/16 | (2006.01) |
| B60R 16/023 | (2006.01) |
| B62D 61/12 | (2006.01) |
| G01F 23/22 | (2006.01) |
| G01L 17/00 | (2006.01) |
| G01P 3/00 | (2006.01) |
| G01S 19/52 | (2010.01) |

(52) U.S. Cl.
CPC ............ *B28C 5/4217* (2013.01); *B28C 5/422* (2013.01); *B28C 5/4272* (2013.01); *B60P 3/16* (2013.01); *B60R 16/023* (2013.01); *B62D 61/12* (2013.01); *G01F 23/22* (2013.01); *G01L 17/00* (2013.01); *G01P 3/00* (2013.01); *G01S 19/52* (2013.01); *B60C 23/001* (2013.01)

(58) Field of Classification Search
CPC ..... B28C 5/4217; B28C 5/422; B28C 5/4272; B60P 3/16; B60R 16/023; B62D 61/12; G01F 23/22; G01F 23/0007; G01L 17/00; G01P 3/00; G01S 19/52; B60C 23/001; B60C 23/002; B60C 23/04
USPC .................................................. 366/53–68
See application file for complete search history.

(56) References Cited

U.S. PATENT DOCUMENTS

| | | | |
|---|---|---|---|
| 7,578,379 B2 | 8/2009 | Gillmore et al. | |
| 7,648,015 B2 | 1/2010 | Gillmore et al. | |
| 7,931,397 B2 | 4/2011 | Lindblom et al. | |
| 8,287,173 B2 | 10/2012 | Khouri | |
| 8,573,611 B1 * | 11/2013 | Jensen | B60G 17/017 280/86.5 |
| 8,613,543 B2 | 12/2013 | Lindblom et al. | |
| 8,646,965 B2 | 2/2014 | Datema et al. | |
| 8,989,905 B2 * | 3/2015 | Sostaric | B28B 23/0031 700/265 |
| D737,866 S | 9/2015 | Datema et al. | |

(Continued)

*Primary Examiner* — Charles Cooley
(74) *Attorney, Agent, or Firm* — Foley & Lardner LLP

(57) ABSTRACT

A vehicle including a chassis, a lift axle coupled to the chassis and including a tractive element, a lift actuator coupled to the lift axle, a location sensor configured to provide location data indicating a location of the vehicle, and a controller operatively coupled to the lift actuator and the location sensor and configured to control the lift actuator to reposition the lift axle based on the location data.

11 Claims, 17 Drawing Sheets

(56) References Cited

U.S. PATENT DOCUMENTS

| | | | |
|---|---|---|---|
| D772,306 S | 11/2016 | Datema et al. | |
| 9,694,671 B2 | 7/2017 | Wildgrube et al. | |
| 10,239,403 B2 | 3/2019 | Broker et al. | |
| 10,414,067 B2 | 9/2019 | Datema et al. | |
| 10,792,613 B1 | 10/2020 | Drake et al. | |
| 10,843,379 B2 | 11/2020 | Rocholl et al. | |
| 10,901,409 B2 | 1/2021 | Datema et al. | |
| 10,987,829 B2 | 4/2021 | Datema et al. | |
| 11,833,713 B2 * | 12/2023 | Datema | B28C 5/422 |
| 12,172,546 B2 * | 12/2024 | Messina | B28C 5/4272 |
| 2005/0131600 A1 * | 6/2005 | Quigley | G01M 17/00 |
| | | | 701/32.8 |
| 2011/0029134 A1 * | 2/2011 | Hazrati | B28C 7/026 |
| | | | 700/265 |
| 2014/0269145 A1 | 9/2014 | Fasana et al. | |
| 2015/0355160 A1 * | 12/2015 | Berman | G01N 27/048 |
| | | | 73/54.03 |
| 2018/0250847 A1 * | 9/2018 | Wurtz | B28C 5/4203 |
| 2019/0077468 A1 * | 3/2019 | Hulstein | B62D 33/077 |
| 2019/0217698 A1 | 7/2019 | Broker et al. | |
| 2019/0344475 A1 | 11/2019 | Datema et al. | |
| 2020/0230841 A1 | 7/2020 | Datema et al. | |
| 2020/0230842 A1 | 7/2020 | Datema et al. | |
| 2021/0031649 A1 | 2/2021 | Messina et al. | |
| 2021/0039719 A1 | 2/2021 | Datema et al. | |
| 2021/0069934 A1 | 3/2021 | Rocholl et al. | |
| 2021/0107179 A1 | 4/2021 | Glunz | |
| 2021/0124347 A1 | 4/2021 | Datema et al. | |
| 2021/0171137 A1 | 6/2021 | Zuleger et al. | |
| 2021/0276222 A1 * | 9/2021 | Datema | B60R 16/023 |
| 2021/0276643 A1 * | 9/2021 | Ellifson | B60B 35/007 |
| 2022/0063133 A1 * | 3/2022 | Van Dixhorn | B28C 7/024 |
| 2022/0388199 A1 * | 12/2022 | Datema | B28C 5/4206 |
| 2023/0174000 A1 | 6/2023 | Peotter et al. | |
| 2023/0174178 A1 | 6/2023 | Andringa | |
| 2023/0271347 A1 * | 8/2023 | Datema | B28C 7/026 |
| | | | 366/2 |
| 2024/0058989 A1 * | 2/2024 | Datema | G01S 19/52 |

* cited by examiner

AXLE PRESSURE SETTING SYSTEMS AND METHODS

CROSS-REFERENCE TO RELATED PATENT APPLICATION

This application is a continuation of U.S. patent application Ser. No. 17/184,100, filed Feb. 24, 2021, which claims the benefit of U.S. Provisional Patent Application No. 62/986,463, filed Mar. 6, 2020, both of which are incorporated herein by reference in their entireties.

BACKGROUND

The present disclosure relates generally to vehicle control systems. More specifically, the present disclosure relates to a control system for controlling one or more axles of a vehicle.

Certain vehicles, such as concrete mixers and dump trucks, carry heavy payloads (e.g., concrete) to various locations (e.g., job sites). To minimize the wear of the gross weight of the vehicle and the payload on the road and the vehicle, additional axles may be added to the vehicle to distribute the gross weight over a larger area (e.g., such that the total contact area between the tires of the vehicle and the ground increases). Once the vehicle arrives at a job site, payload may be unloaded, reducing the weight of the vehicle. The unloaded vehicle may then be driven to another location (e.g., a location where another payload is then loaded onto the vehicle). In the unloaded state, the additional axles may not be necessary. To effectively accommodate both situations, vehicles include lift axles that can be selectively engaged with the ground to distribute the load of the vehicle and reduce the weight supported by each individual axle. Conventionally, operation (e.g., raising or lowering) of these axles is controlled manually by an operator.

SUMMARY

At least one embodiment relates to a concrete mixing truck includes a chassis, a front axle and a rear axle coupled to the chassis, a lift axle coupled to the chassis and including a tractive element, a lift actuator coupled to the lift axle, a mixing drum rotatably coupled to the chassis, a fill level sensor coupled to the mixing drum and configured to provide a signal indicative of a fill level of a material within the mixing drum, and a controller. The lift axle is selectively repositionable between a lowered position in which the tractive element engages a support surface and a raised position in which the tractive element is lifted out of engagement with the support surface. The controller is operatively coupled to the lift actuator and the fill level sensor and configured to control the lift actuator to reposition the lift axle into the lowered position in response to the fill level exceeding a threshold fill level.

At least one embodiment relates to a control system including a controller configured to receive a signal from a variety of input devices. The input devices include a fill level sensor including a fill level, a global positioning system (GPS), a speed sensor, and a tire pressure sensor. The controller provides a signal to a variety of output devices. The variety of output devices include an axle lift controller. The axle lift controller is configured to reposition a lift axle in an upper position and a lower position. The lift axle is positioned in a lowered position in response to the fill level exceeding a fill level threshold.

At least one embodiment relates to a method of controlling a concrete mixing truck including providing a chassis including a front axle and a rear axle, coupling a lift axle including a tractive element to the chassis, coupling a lift actuator to the lift axle, coupling a mixing drum to the lift actuator, coupling a fill level sensor to the mixing drum, and coupling a controller to the signal wherein the controller controls the position of the lift axle based on the signal response. The lift axle can be selectively positioned in a lowered position where the tractive element engages a ground support and a raised position where the tractive element disengages from the ground support. The sensor is configured to provide a signal response.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
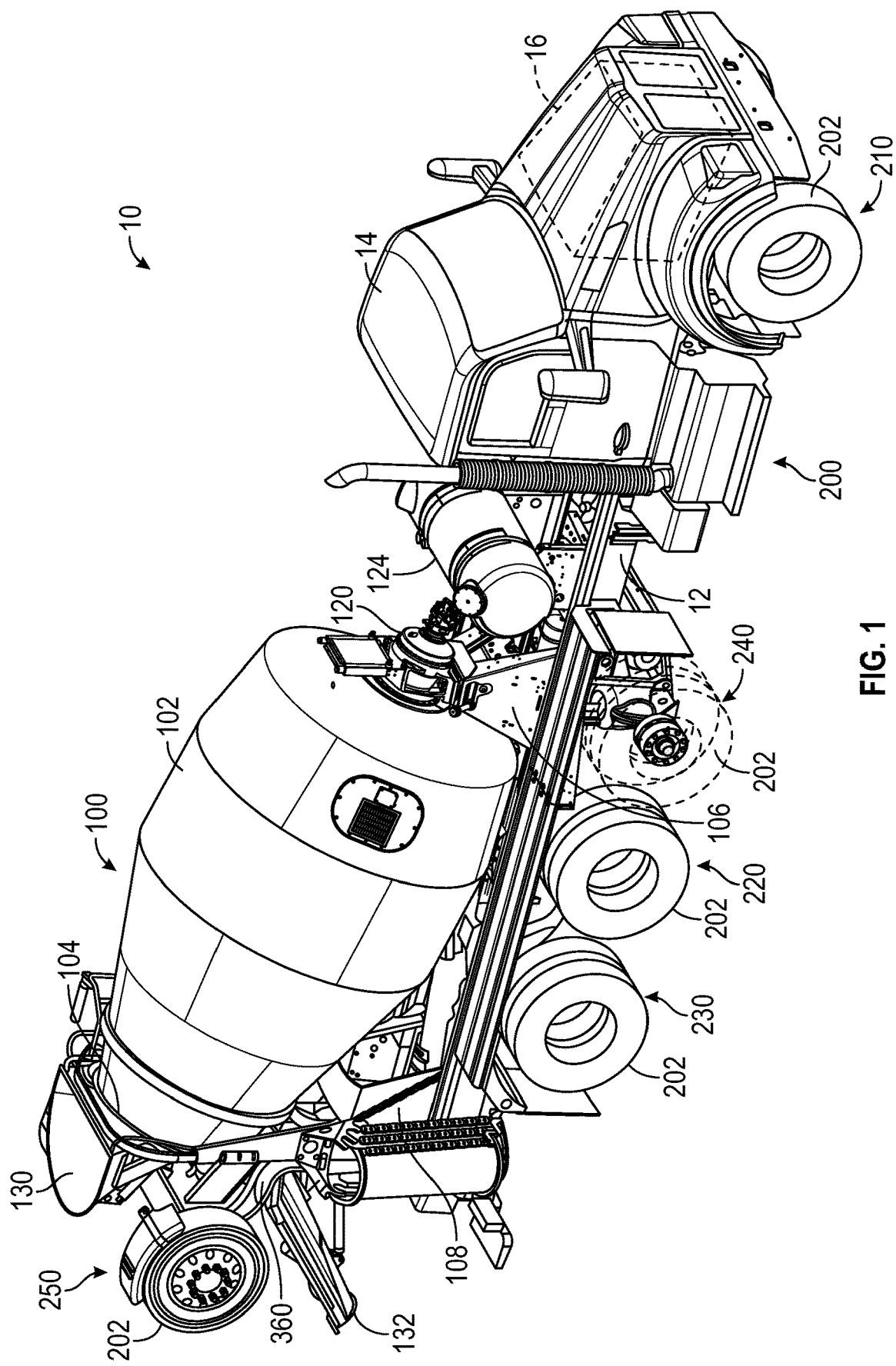
FIG. 1 is a top, left perspective view of a concrete mixer truck, according to an exemplary embodiment.
Figure 2:
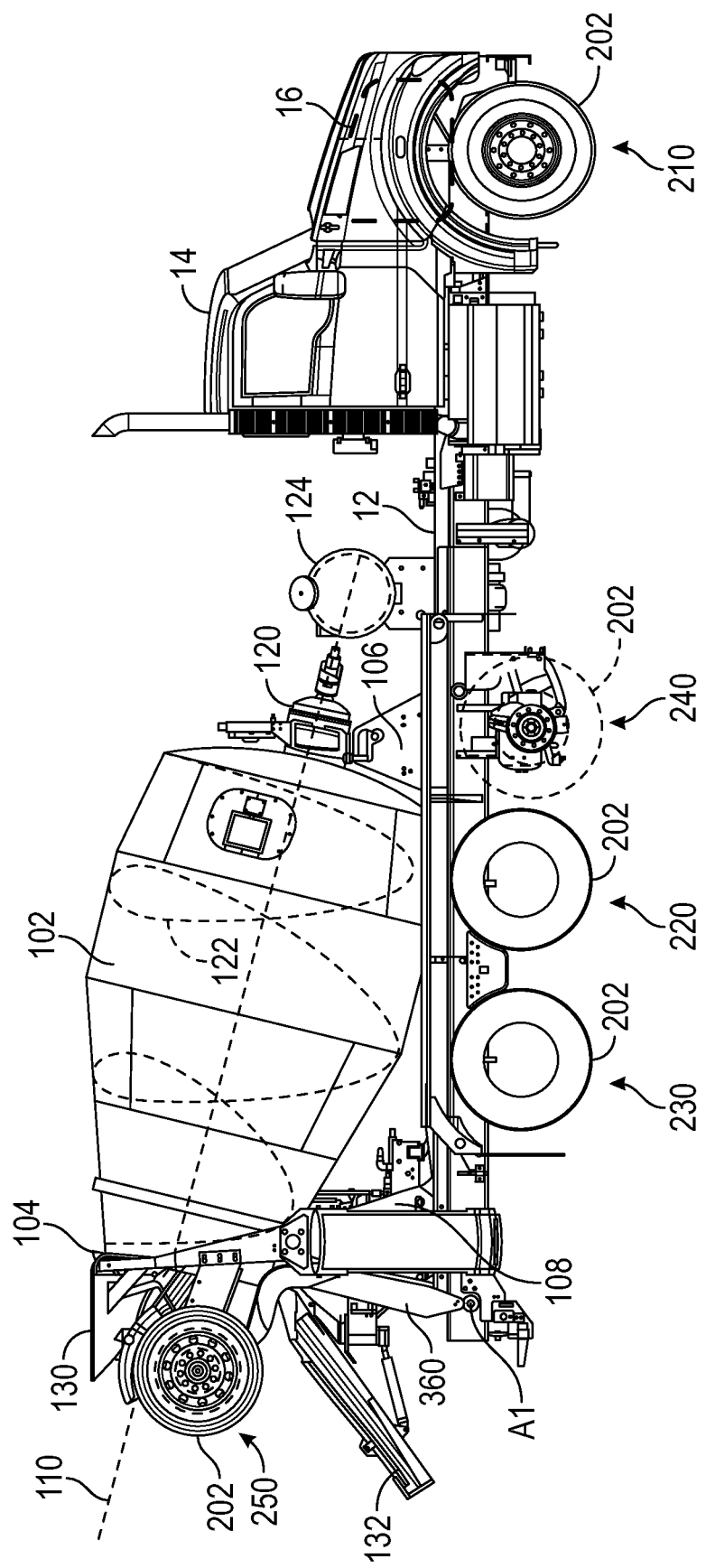
FIG. 2 is a left side view of the concrete mixer truck of FIG. 1.
Figure 3:
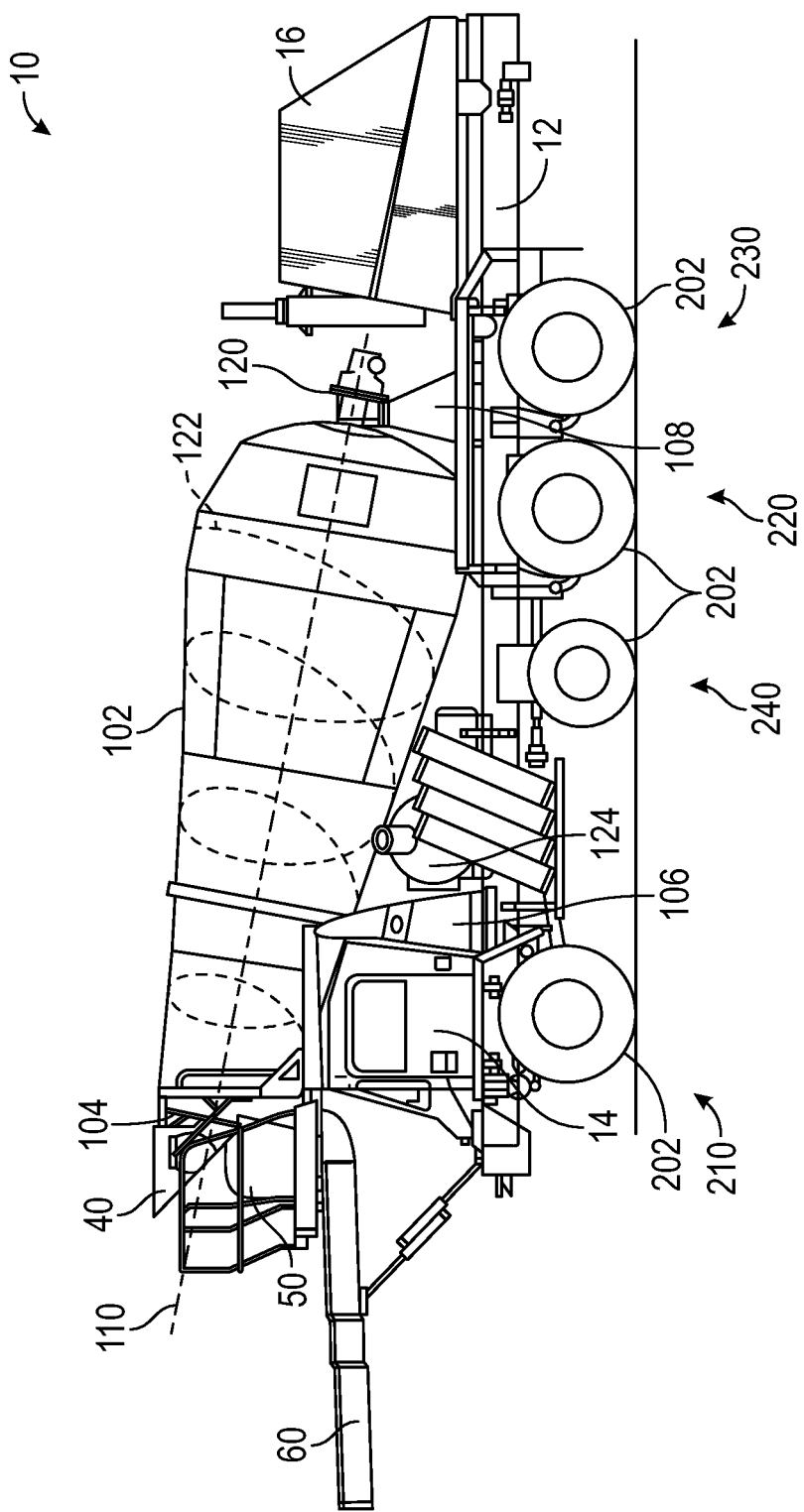
FIG. 3 is a right side view of a concrete mixer truck, according to another exemplary embodiment.
Figure 4:
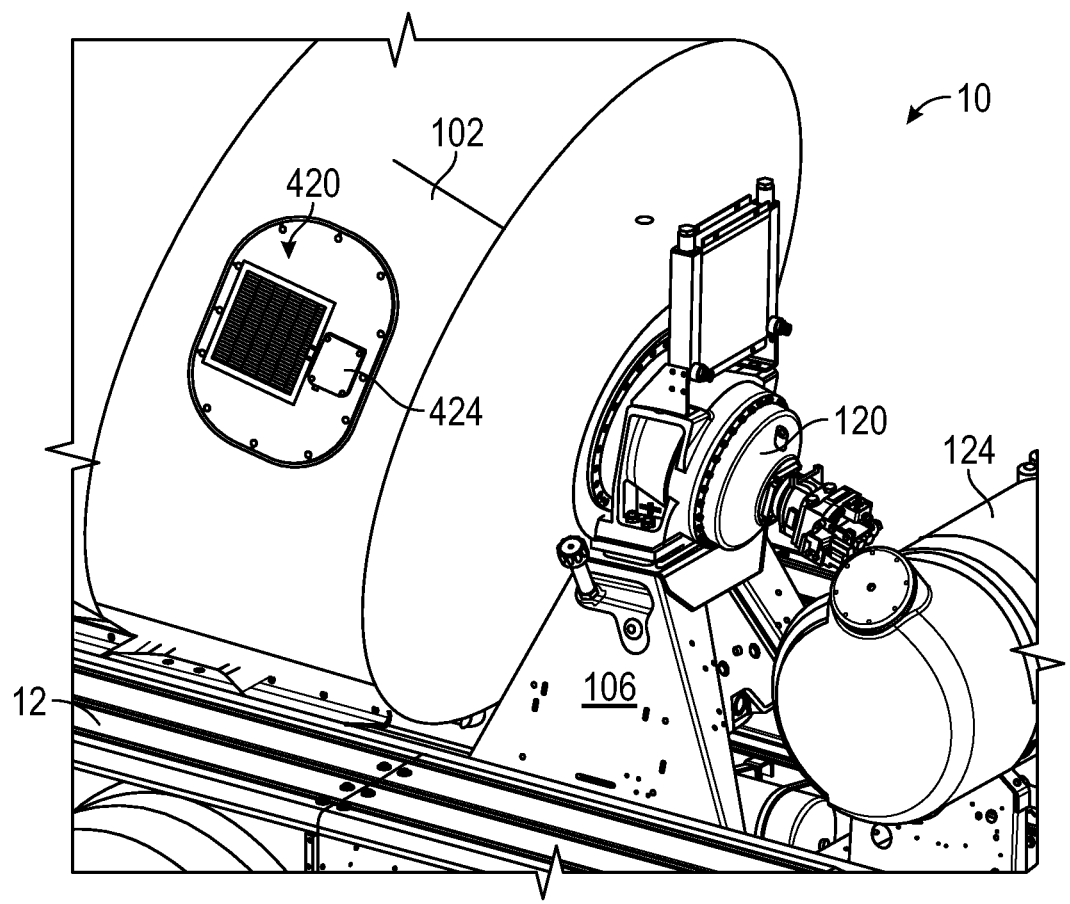
FIG. 4 is a top, left perspective view of the concrete mixer truck of FIG. 1.

Referring to FIGS. 1-3, a vehicle, shown as concrete mixer truck 10, includes a chassis, shown as frame 12, and a cab, body, cabin, or personnel compartment, shown as cab 14, coupled to the frame 12 (e.g., at a front end thereof with respect to the main direction of travel). The frame 12 extends longitudinally along a length of the concrete mixer truck 10 (e.g., from a front end to a rear end, along a longitudinal axis that extends in a direction of travel, etc.). The frame 12 may include one or more frame rails. The cab 14 is configured to hold one or more occupants (e.g., a driver or operator and/or one or more passengers, etc.). The cab 14 may include various components to facilitate operation of the concrete mixer truck 10 by an operator (e.g., a seat, a steering wheel, hydraulic controls, a user interface, switches, buttons, dials, etc.).

As shown in FIGS. 1-3, the concrete mixer truck 10 includes a prime mover, shown as engine 16. The engine 16 is configured to supply mechanical energy (e.g., rotational mechanical energy) to power one or more functions of the concrete mixer truck 10 (e.g., propelling the concrete mixer truck 10, driving the mixing drum 102, etc.). In the embodiment of FIG. 1, the engine 16 is coupled to the frame 12 adjacent the cab 14 (e.g., at a front end of the cab 14, at a front end of the concrete mixer truck 10). In the embodiment shown in FIG. 3, the engine 16 is coupled to the frame 12 at a rear end of the concrete mixer truck 10. The engine 16 may be configured to utilize one or more of a variety of fuels (e.g., gasoline, diesel, bio-diesel, ethanol, natural gas, etc.), according to various exemplary embodiments. Additionally or alternatively, the prime mover may include one or more electric motors and/or generators, which may be coupled to the frame 12 (e.g., as a hybrid vehicle, an electric vehicle, etc.). The electric motors may consume electrical power from an on-board storage device (e.g., batteries, ultra-capacitors, etc.), from an on-board generator (e.g., an internal combustion engine, a genset, etc.), and/or from an external power source (e.g., overhead power lines, etc.) and provide power (e.g., rotational mechanical energy) to systems of the concrete mixer truck 10.

Drum Assembly

As shown in FIGS. 1-3, the concrete mixer truck 10 includes a payload container, a mixing assembly, a mixing drum assembly, or equipment, shown as drum assembly 100. The drum assembly 100 is configured to receive and mix dry ingredients (e.g., cementitious material, aggregate, sand, etc.) and water and to form a wet concrete mixture, which can be transported to a job site. The drum assembly 100 then dispenses the concrete at the job site (e.g., for use in forming one or more structures, such as buildings, roads, or foundations). The drum assembly 100 includes a mixing drum, shown as mixing drum 102. The mixing drum 102 is coupled to the frame 12 and disposed behind the cab 14 (e.g., at a rear and/or middle of the frame 12, etc.). The mixing drum 102 defines an inlet/outlet, shown as mixing drum aperture 104, through with material enters and exits the mixing drum 102. In the embodiment shown in FIGS. 1 and 2, the mixing drum aperture 104 is positioned at a rear end of the frame 12 (i.e., the concrete mixer truck 10 is a rear discharge concrete mixer truck). In the embodiment shown in FIG. 3, the mixing drum 102 extends over the cab 14, and the mixing drum aperture 104 is positioned at the front end of the frame 12 (i.e., the concrete mixer truck 10 is a front discharge concrete mixer truck).

As shown in FIGS. 1-4, the concrete mixer truck 10 includes a first support, shown as front pedestal 106, and a second support, shown as rear pedestal 108. According to an exemplary embodiment, the front pedestal 106 and the rear pedestal 108 rotatably couple the mixing drum 102 to the frame 12. By way of example, one or both of the pedestals may include one or more bearings that engage an outer surface of the mixing drum 102. The mixing drum 102 is configured to rotate relative to the frame about a central, longitudinal axis of rotation, shown as axis 110. In some embodiments, the axis 110 is oriented generally upward as the mixing drum 102 extends toward the mixing drum aperture 104 to facilitate retaining the mixture within the mixing drum 102. As shown in FIGS. 1-3, the axis 110 is angled relative to the frame 12 such that the axis 110 intersects a horizontal plane extending along a top of the frame 12. According to an exemplary embodiment, the axis 110 is elevated from the frame 12 at an angle in the range of five degrees to twenty degrees. In other embodiments, the axis 110 is elevated by less than five degrees (e.g., four degrees, three degrees, etc.) or greater than twenty degrees (e.g., twenty-five degrees, thirty degrees, etc.). In an alternative embodiment, the concrete mixer truck 10 includes an actuator positioned to facilitate selectively adjusting the axis 110 to a desired or target angle (e.g., manually in response to an operator input/command, automatically according to a control scheme, etc.).

According to an exemplary embodiment, drum assembly 100 includes a rotational actuator (e.g., an electric motor, a hydraulic motor, etc.), shown as drum motor 120. The drum motor 120 is configured to drive rotation of the mixing drum 102 about the axis 110. In some embodiments, the drum motor 120 is powered by the engine 16. By way of example, the engine 16 may drive a pump that provides a flow of pressurized hydraulic fluid to the drum motor 120. In other embodiments, the drum motor 120 is an electric motor that consumes electrical energy (e.g., from an energy storage device, such as a battery, from a generator coupled to the engine 16, etc.). The drum motor 120 may rotatably couple the mixing drum 102 to the front pedestal 106 (e.g., as shown in FIG. 1) or to the rear pedestal 108 (e.g., as shown in FIG. 3).

As shown in FIGS. 2 and 3, the drum assembly 100 includes at least one internal protrusion (e.g., a ridge, a fin, a plate, etc.), shown as mixing element 122. The mixing element 122 extends inward from an internal surface of the mixing drum 102 such that the mixing element 122 agitates the mixture within the mixing drum 102 when the mixing drum 102 is rotated (e.g., by the drum motor 120). The mixing element 122 extends longitudinally along a length of the mixing drum 102. In some embodiments, the mixing element 122 is shaped (e.g., helical or spiral-shaped) such that the mixing element 122 (*a*) drives the mixture toward the mixing drum aperture 104 when driven in a first rotational direction (e.g., clockwise) and (b) drives the mixture away from the mixing drum aperture 104, agitating the mixture, when driven in a second rotational direction opposite the first rotational direction (e.g., counterclockwise). Accordingly, the drum motor 120 is configured to control whether the mixture is agitated or dispensed by controlling the direction of rotation of the mixing drum 102. In some embodiments, the drum assembly 100 includes a container or vessel, shown as water tank 124, that contains a volume of water. The water tank 124 may selectively (e.g., as controlled by a pump and/or valve) supply water to the mixing drum 102 to control a characteristic (e.g., consistency, slump, etc.) of the mixture within the mixing drum 102.

As shown in FIGS. 1-3, the drum assembly 100 includes an inlet assembly, shown as hopper 130, coupled to the frame 12. The hopper 130 is positioned at the mixing drum aperture 104 and configured to direct material (e.g., dry ingredients, water, etc.) into the mixing drum 102 through the mixing drum aperture 104. The drum assembly 100 further includes an outlet assembly, shown as chute 132, coupled to the frame 12. The chute 132 is positioned at the mixing drum aperture 104 such that the chute 132 receives material (e.g., the concrete mixture) discharged from the mixing drum 102. The chute 132 may be selectively repositioned by an operator to control the trajectory of the material. In some embodiments, the drum assembly 100 further includes a funnel, shown as collector 134, that is positioned between the mixing drum aperture 104. The collector 134 may be positioned and sized to receive the material discharged from the mixing drum aperture 104 and direct the material to the chute 132.

Drivetrain

Referring to FIGS. 1-3 and 5, the concrete mixer truck 10 includes a drivetrain, powertrain, drive system, or ground engagement system, shown as drivetrain 200. The drivetrain 200 is coupled to the frame 12 and configured to engage a support surface (e.g., the ground) to support the concrete mixer truck 10. Specifically, the drivetrain 200 includes a series of tractive elements (e.g., wheel and tire assemblies), shown as wheels 202, configured to engage the support surface. The wheels 202 are coupled to the frame 12 by a series of axle assemblies extending laterally across the frame 12. The axle assemblies are offset longitudinally from one another along the length of the concrete mixer truck 10. The drivetrain 200 includes a first axle assembly (e.g., a steering axle, a drive axle), shown as front axle 210; a second axle assembly (e.g., a non-steering or fixed axle, a drive axle), shown as front tandem axle 220; and a third axle assembly (e.g., a non-steering or fixed axle, a drive axle), shown as rear tandem axle 230; a fourth axle assembly (e.g., a non-powered axle, a lift axle), shown as pusher axle 240; and a fifth axle assembly (e.g., a non-powered axle, a lift axle), shown as tag axle 250. In other embodiments, the drivetrain 200 includes more or fewer axle assemblies. By way of example, the tandem axles may be replaced with a single driven axle. By way of example, the drivetrain 200 may include multiple pusher axles 240 and/or tag axles 250.

As shown, the front axle 210 is the frontmost axle assembly and is positioned at the front end of the frame 12. In some embodiments, the front axle 210 is positioned directly below the cab 14. The front tandem axle 220 and the rear tandem axle 230 are positioned rearward of the front axle 210 in a tandem (i.e., side-by-side) configuration. The front tandem axle 220 is positioned forward of the rear tandem axle 230. In some embodiments, the front tandem axle 220 and the rear tandem axle 230 are positioned directly below the drum assembly 100. The pusher axle 240 is positioned between the front axle 210 and the front tandem axle 220. In some embodiments, the pusher axle 240 is positioned directly below the drum assembly 100. The tag axle 250 is positioned rearward of the rear tandem axle 230.

Figure 5:
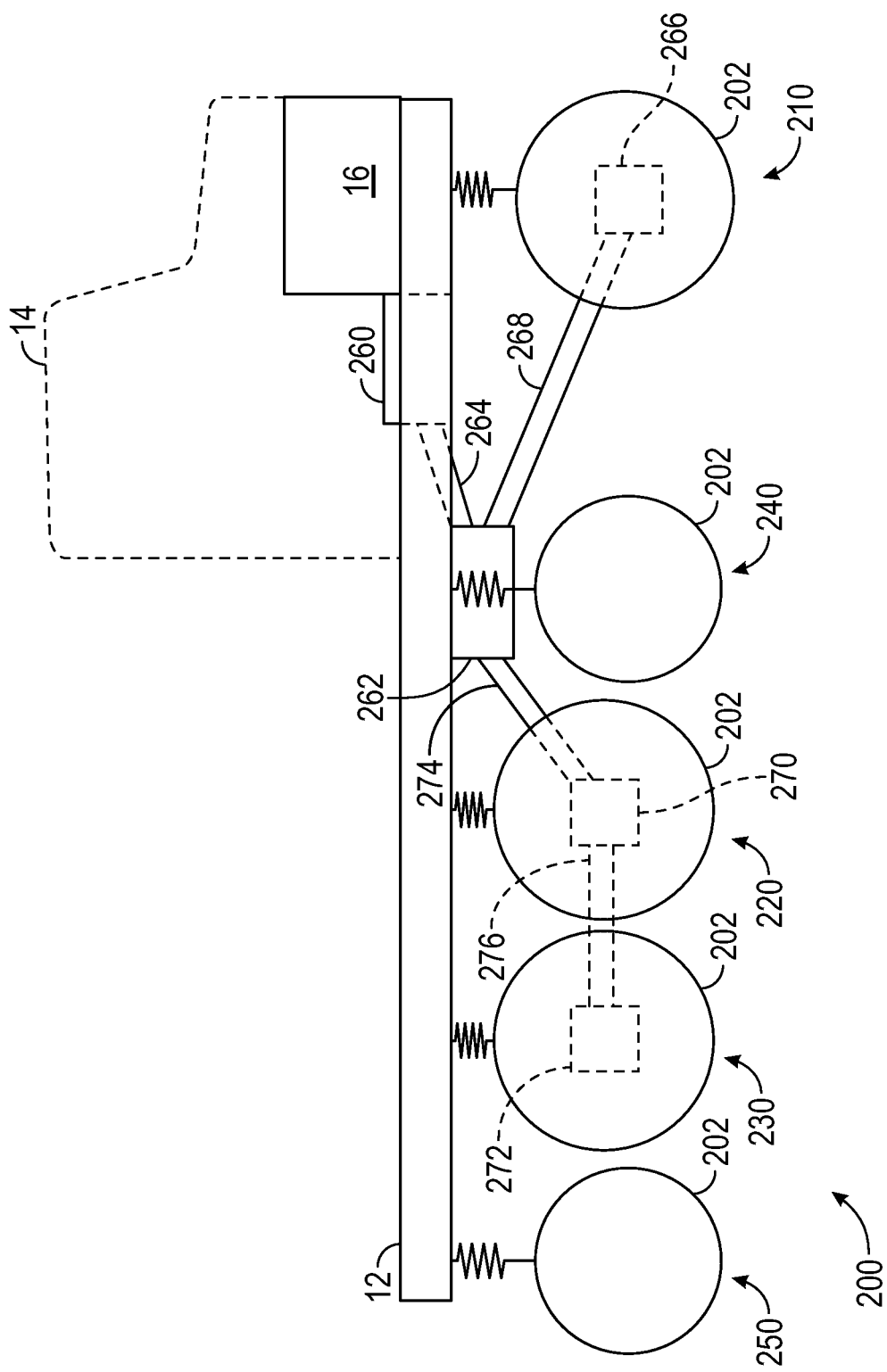
FIG. 5 is a schematic of a drivetrain of a concrete mixer truck, according to an exemplary embodiment.

As shown in FIG. 5, the drivetrain 200 includes components that couple the engine 16 to certain axles to permit the axles to drive the wheels 202 to propel the concrete mixer truck 10. The concrete mixer truck 10 includes a power transfer device (e.g., a gearbox, a power transmission, a torque control device, or a variable radio transmission), shown as transmission 260. The transmission 260 is coupled (e.g., directly coupled, coupled by one or more intermediate shafts, etc.) to the engine 16 such that the transmission 260 is configured to receive rotational mechanical energy from the engine 16. The transmission 260 may include one or more gears, brakes, clutches, or other power transmission devices configured to control (e.g., automatically, manually in response to an input from a user, etc.) an output speed of the transmission 260.

Referring still to FIG. 5, the transmission 260 is coupled to a torque transfer device or torque distribution device, shown as transfer case 262. As shown, the transfer case 262 is coupled to the transmission 260 by a shaft, shown as driveshaft 264. In other embodiments, the transfer case 262 is otherwise coupled (e.g., directly coupled) to the transmission 260. The transmission 260 and the transfer case 262 may be coupled to the frame 12. The transmission 260 transfers rotational mechanical energy from the engine 16 to the transfer case (e.g., through the driveshaft 264). The transfer case 262 then divides and transfers this rotational mechanical energy to the front axle 210 and the tandem axles.

The front axle 210 includes a power transmission device, shown as differential 266, that is coupled to the transfer case 262 by a shaft, shown as driveshaft 268. The differential 266 transfers rotational mechanical energy from the transfer case 262 to each wheel 202 of the front axle 210. The front tandem axle 220 includes a power transmission device, shown as differential 270, and the rear tandem axle 230 includes a power transmission device, shown as differential 272. The differential 270 is coupled to the transfer case 262 by a driveshaft 274, and the differential 272 is coupled to the differential 270 by a driveshaft 276. The differential 270 transfers rotational mechanical energy from the transfer case 262 to the wheels 202 of the front tandem axle 220 and to the differential 272 (e.g., through the driveshaft 276). The differential 272 transfers rotational mechanical energy from the driveshaft 276 to the wheels 202 of the rear tandem axle 230. Accordingly, the using this mechanical energy, the wheels 202 of the front axle 210, the front tandem axle 220, and the rear tandem axle 230 propel the concrete mixer truck 10. In other embodiments, one or more of the front axle 210, the front tandem axle 220, and the rear tandem axle 230 are not driven. In such an embodiment, the transfer case 262 may be omitted, and one or more differentials (e.g., the differential 270) may be directly coupled to the transmission 260.

In some embodiments, the pusher axle 240 and the tag axle 250 are non-powered (e.g., non-driven, free-spinning, etc.) such that the wheels 202 of the pusher axle 240 and the tag axle 250 rotate freely (e.g., as concrete mixer truck 10 travels). Accordingly, the pusher axle 240 and the tag axle 250 may be decoupled from the engine 16 such that they pusher axle 240 and the tag axle 250 do not receive rotational mechanical energy from the engine 16 to propel the vehicle. The pusher axle 240 and/or the tag axle 250 may be configured to selectively engage the support surface (e.g., may be selectively raised or lowered to engage the ground) to support the gross weight of the concrete mixer truck 10 (i.e., the weight of the concrete mixer truck 10 and any payload, such as concrete, that is supported by the concrete mixer truck 10). By way of example, when the gross weight of the concrete mixer truck 10 is relatively high (e.g., the concrete mixer truck 10 is loaded with concrete), the pusher axle 240 and/or the tag axle 250 may be lowered to engage the ground. This puts a greater number of wheels 202 in contact with the ground, decreasing the weight supported by each wheel 202 and thus the pressure exerted on the ground. This may reduce wear on roads, and may be required by certain regulatory bodies in certain situations (e.g., a maximum weight per axle may be specified). When the gross weight of the concrete mixer truck 10 is relatively low (e.g., the mixing drum 102 is empty), the pusher axle 240 and/or the tag axle 250 may be lifted out of contact with the ground. This may reduce wear on the axle assemblies (e.g., bearing wear, tire wear, etc.) and may improve fuel efficiency.

Figure 6:
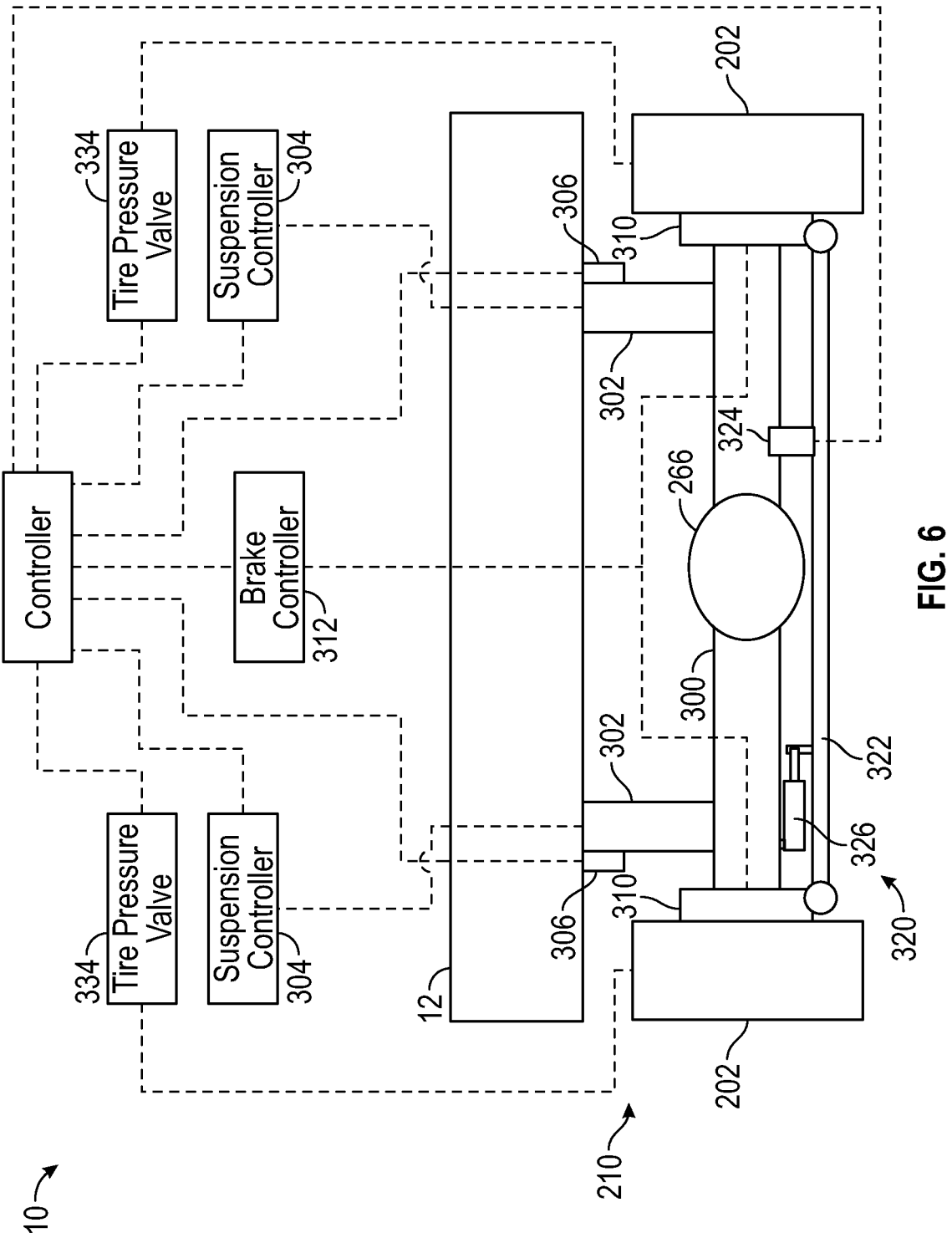
FIG. 6 is a block diagram of a front axle of the drivetrain of FIG. 5.
Figure 7:
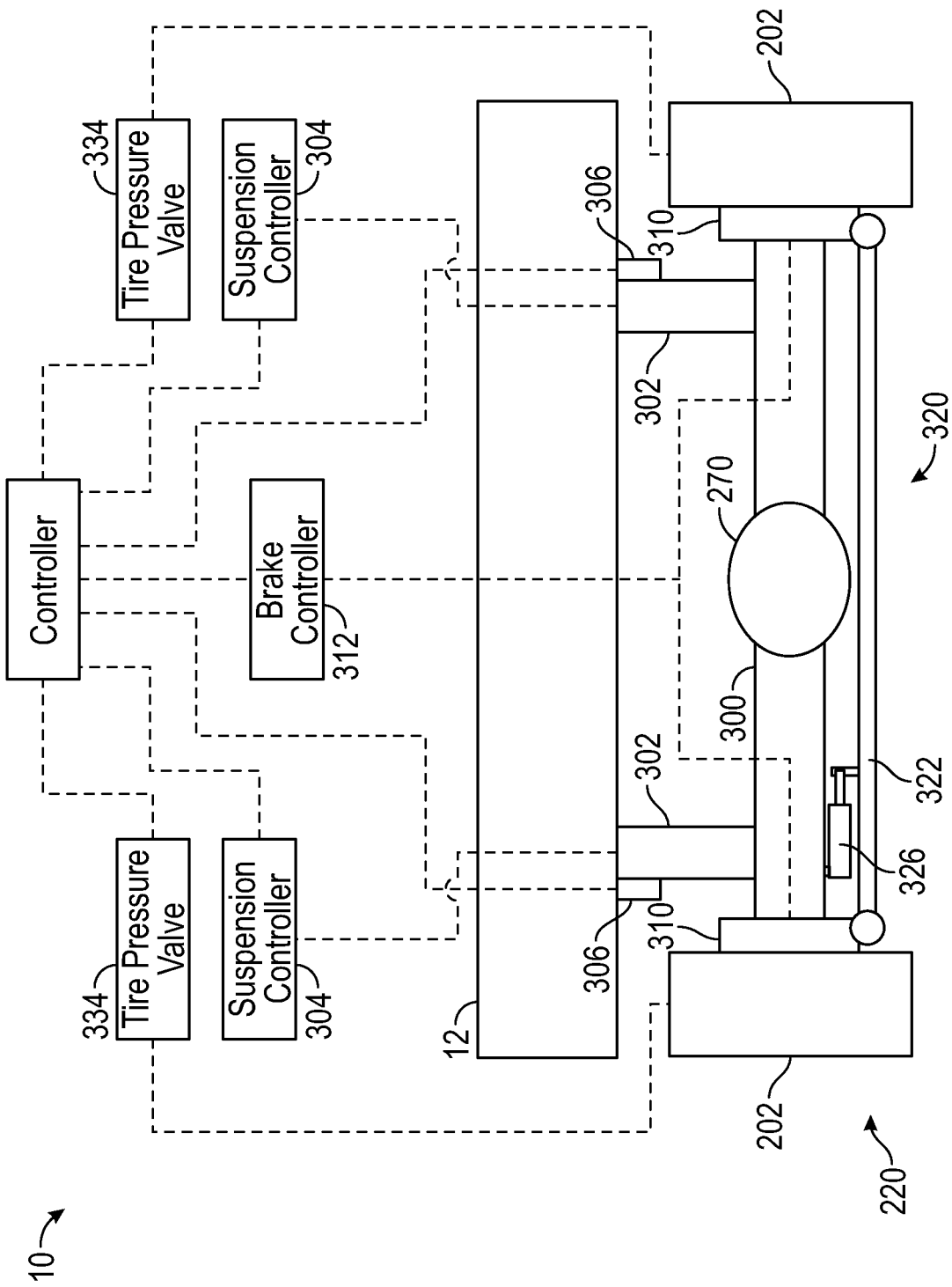
FIG. 7 is a block diagram of a front tandem axle of the drivetrain of FIG. 5.
Figure 8:
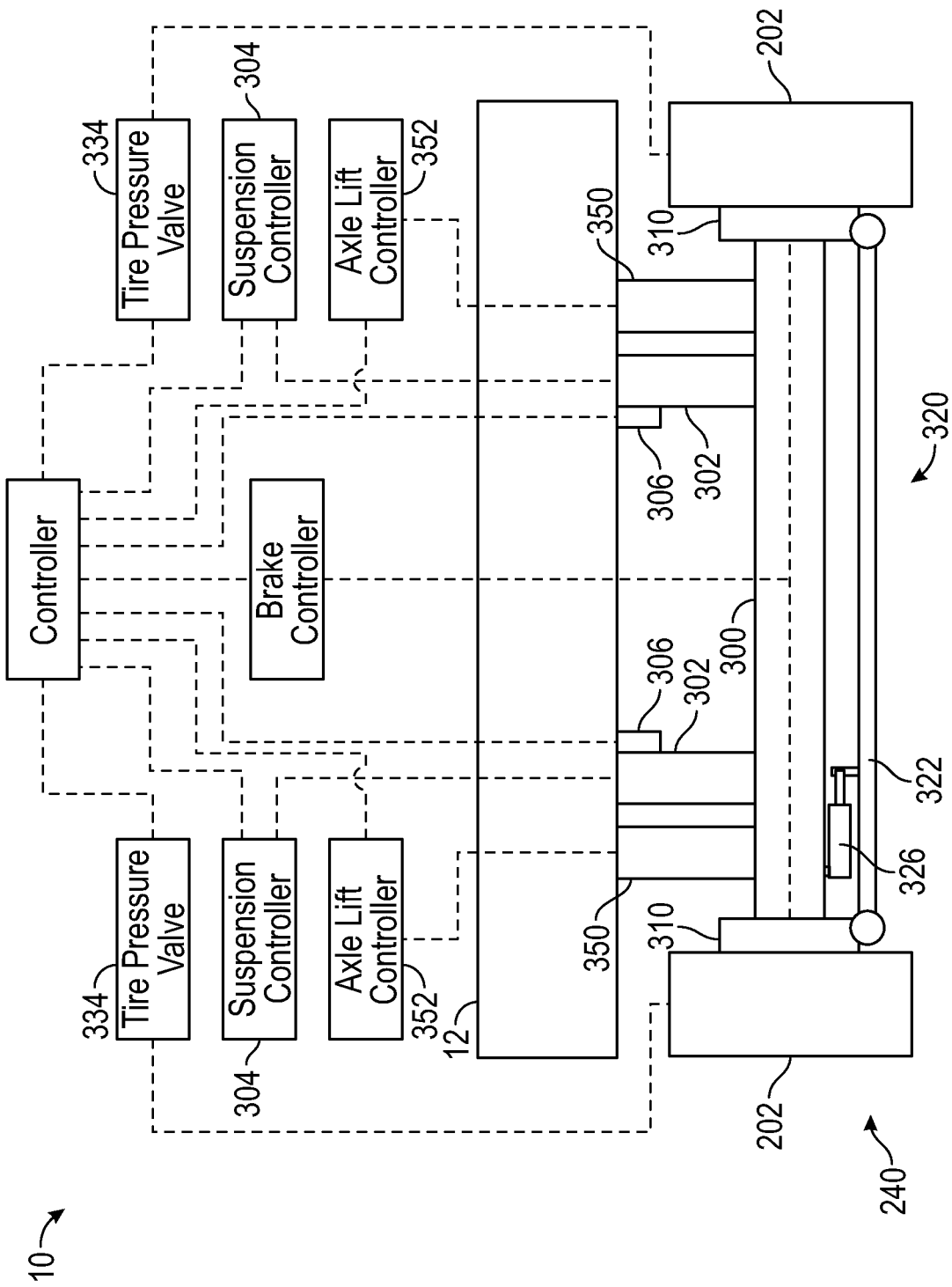
FIG. 8 is a block diagram of a pusher axle of the drivetrain of FIG. 5.

FIGS. 6-8 illustrate the various systems that control each axle. Each axle includes a series of actuators that permit the user or a controller (e.g., the controller 402) to control one or more aspects of the operation of each axle. In FIGS. 6-9, dashed lines are used to illustrate the communication of signals (e.g., electrical signals, pressurized fluids, movement of a mechanical linkage, etc.) between different components. This communication may include one-way or two-way communication. As shown and described with respect to FIGS. 6-8, each axle includes two wheels 202, one positioned at each end of the axle. In other embodiments, each axle includes multiple wheels 202 at each end. Although specific arrangements of each axle are shown, in other embodiments, the components of each axle are otherwise positioned.

Referring to FIG. 6, the front axle 210 is shown according to an exemplary embodiment. The front axle 210 includes an assembly, shown as axle main body 300. The axle main body 300 may include a housing and/or one or more axle shafts that transfer rotational mechanical energy to the wheels 202. The axle main body 300 may additionally include one or more housing members rotatably coupled (e.g., by one or more bearings) to the axle shafts that facilitate connection to the frame 12 and other components of the front axle 210. The axle main body 300 further includes the differential 266. The axle main body 300 may configure the front axle 210 as a dependent suspension (i.e., such that both wheels 202 move together) or an independent suspension (i.e., such that the wheels 202 can move independently of one another).

The axle main body 300 is movably coupled to the frame 12 by a pair of suspension assemblies (e.g., a spring assembly, a damper assembly, a combination spring/damper assembly, etc.), shown as suspension actuators 302. The suspension actuators 302 are coupled to the frame 12 and the axle main body 300 and are offset laterally from one another along the length of the axle main body 300. As shown, the suspension actuators 302 are configured to provide a biasing force to hold the frame 12 upward, away from the axle main body 300. When the axle main body 300 experiences a vertical excitement force (e.g., from the wheels 202 encountering a bump during normal travel of the concrete mixer truck 10), the suspension actuators 302 are configured to control the vertical movement of the axle main body 300 (and thus the wheels 202) relative to the frame 12. The suspension actuators 302 may provide a damping force based on a speed of the axle main body 300 relative to the frame 12. Additionally or alternatively, the suspension actuators 302 may provide a spring force based on the position of the axle main body 300 relative to the frame 12.

The suspension actuators 302 may include a spring element (e.g., a biasing element) that provides a spring force and/or a dampening element that provides a dampening force. In some embodiments, the spring element is a gas spring (e.g., an air bag) that contains a compressible gas. The compressible gas may exert a biasing spring force that biases the frame 12 upward. In other embodiments, the suspension actuators 302 include coil springs, leaf springs, or yet other types of biasing elements. In some embodiments, the dampening elements include one or more dampeners that produce a dampening force by forcing a fluid through an orifice. The spring elements and/or dampening elements may be coupled to the axle main body 300 and the frame 12 by one or more linkages, brackets, mounts, or other coupling arrangements.

In some embodiments, the suspension actuators 302 are actively controlled to vary the ride height and/or the suspension response characteristics of each suspension actuator 302. By way of example, a fluid (e.g., compressed gas, hydraulic oil, etc.) can be selectively added or removed from each suspension actuator 302 to vary the length of the suspension actuator 302. If this is performed by multiple suspension actuators 302 (e.g., the suspension actuators of the front axle 210, the front tandem axle 220, and the rear tandem axle 230), the ride height of the concrete mixer truck 10 may be varied. By way of another example, a fluid may be selectively added or removed from each suspension actuator 302 to vary the force applied by each suspension actuator 302. By adding fluid (e.g., gas) to one suspension actuator 302, the pressure within the suspension actuator 302 increases, increasing the force imparted by the suspension actuator 302. This increases the portion of the gross weight of the concrete mixer truck 10 supported by the suspension actuator 302 (and thus the closest wheel 202 and the front axle 210 as a whole). Accordingly, fluid may be added to the suspension actuator 302 to control the force that the corresponding wheel 202 exerts on the ground.

As shown in FIG. 6, each suspension actuator 302 is coupled (e.g., operatively, fluidly, etc.) to a suspension control device, suspension controller, valve, or actuator, shown as suspension controller 304. The suspension controller 304 is configured to control at least one of (a) the position of the corresponding wheel 202 (e.g., by varying the length of the suspension actuator 302) or (b) the suspension response characteristics of the suspension actuator 302. In some embodiments, the suspension controller 304 includes one or more valves that control the flow of fluid into or out of the suspension actuator 302. Accordingly, the suspension controller 304 may control both the position of the corresponding wheel 202 and the force exerted by the corresponding wheel 202. By including a suspension controller 304 for each suspension actuator 302, the suspension of each wheel 202 can be independently controlled. In other embodiments, one of the suspension actuators 302 is omitted, and one suspension controller 304 controls both suspension actuators 302. In such an embodiment, the suspension controller 304 may provide similar control outputs (e.g., fluid at the same pressure or flow rate) to each suspension actuator 302.

In other embodiments, the suspension actuators 302 are passively controlled. By way of example, each suspension actuators 302 may include coil spring and a sealed damper such that the position of the corresponding wheel 202 and the suspension response characteristics are fixed. In embodiments where the suspension actuators 302 are passively controlled, the concrete mixer truck 10 may have a predetermined or predefined ride height. Additionally or alternatively, the concrete mixer truck 10 may have predetermined or predefined suspension response characteristics.

As shown in FIG. 6, the front axle 210 includes two suspension actuators 302, each at a different lateral position along of the axle main body 300 and each corresponding to a different wheel 202. The deflection (e.g., compression) of each suspension actuator 302 controls the vertical position of the axle main body 300 where the suspension actuator 302 is coupled to the axle main body 300. Because the suspension actuator 302 is closer to one wheel 202 than the other wheel 202, deflection of that suspension actuator 302 also primarily affects the vertical position of that wheel 202 (although this deflection may also affect the vertical position of the other wheel 202 to a lesser degree). Accordingly, when the length of one suspension actuator 302 changes at a different rate than the length of the other suspension actuator 302 of the front axle 210, the front axle 210 rotates (e.g., about a longitudinal axis). This articulation of the axle may facilitate moving over obstacles that only engage one wheel 202 of the front axle 210, permitting the other wheel 202 to stay in engagement with the ground.

Referring again to FIG. 6, in some embodiments, the front axle 210 includes axle articulation controllers (e.g., articulation brakes, articulation locks, etc.), shown as locks 306.

In some embodiments, the locks 306 are coupled to at least one of (a) the frame 12, (b) a suspension actuator 302, or (c) the axle main body 300. The locks 306 are configured to selectively limit (e.g., prevent) movement of the axle main body 300 relative to the frame 12. Accordingly, the locks 306 are configured to selectively prevent vertical movement of the wheels 202. The locks 306 may limit movement of the axle main body 300 directly. By way of example, the locks 306 may be directly coupled to the axle main body 300 and the frame 12 and may maintain a fixed length when engaged. Alternatively, the locks 306 may limit movement of the axle main body 300 indirectly by limiting movement of the suspension actuator 302. By way of example, the locks 306 may prevent fluid flow into or out of the suspension actuator 302. In embodiments where the front axle 210 has a dependent suspension, the locks 306 may control the positions of both wheels 202 simultaneously. In embodiments where the front axle 210 has an independent suspension, the locks 306 may control the positions of each wheel 202 independently. In other embodiments, the front axle 210 includes only one lock 306. In yet other embodiments, the locks 306 are omitted from the front axle 210.

Referring still to FIG. 6, the front axle 210 includes a pair of brake assemblies, shown as brakes 310. Each brake 310 is coupled to one of the wheels 202 (e.g., to a hub of one of the wheels 202). The brakes 310 are configured to resist rotation of the wheels 202 to arrest and/or prevent further motion of the concrete mixer truck 10. The brakes 310 may include disc brakes, drum brakes, or other brake arrangements. The brakes 310 are coupled (e.g., operatively, fluidly, etc.) to a brake control device, brake controller, valve, or actuator, shown as brake controller 312. The brake controller 312 is configured to control actuation of the brakes 310. By way of example, the brake controller 312 may include a pump, compressor, or valve that initiates a flow of pressurized fluid (e.g., brake fluid, air, etc.) to the brakes 310 that engages the brakes, limiting movement of the wheels 202. The brake controller 312 may be coupled to an electronic controller (e.g., the controller 402) or may be initiated mechanically or electromechanically (e.g., in response to an operator pressing a brake pedal, in response to a user engaging a parking brake, etc.).

Referring still to FIG. 6, the front axle 210 includes a heading control assembly, shown as steering assembly 320. The steering assembly 320 is configured to initiate rotation of the wheels 202 about respective vertical or substantially vertical axes, thereby changing the trajectory of the concrete mixer truck 10 (e.g., causing the concrete mixer truck 10 to turn). The steering assembly 320 includes a linkage, shown as tie rod 322, that is coupled to both of the wheels 202 of the front axle 210. The tie rod 322 controls the rotation of both wheels 202 such that the wheels 202 rotate at similar rates and in similar directions. An actuator assembly (e.g., a motor, a linkage, etc.), shown as steering actuator 324, is coupled to the tie rod 322. The steering actuator 324 is configured to steer the concrete mixer truck 10. Specifically, the steering actuator 324 is configured to move the tie rod 322 laterally to cause a corresponding rotation of the wheels 202. The steering actuator 324 may include various motors, linkages, shafts, gears, pins, or other components to facilitate this motion. The steering actuator 324 may be controlled by an operator (e.g., through a user interface device, such as a steering wheel). Such an interface device may directly control the steering actuator 324, or an electronic controller (e.g., the controller 402) may receive an input from the user interface and provide a corresponding output to the steering actuator 324. The steering assembly 320 further includes a dampener and/or biaser (e.g., a spring), shown as steering dampener 326, coupled to the tie rod 322 and the axle main body 300. The steering assembly 320 is configured to apply a dampening force the tie rod 322 to resist motion of steering assembly 320. This may attenuate undesirable movement (e.g., vibration, oscillation, etc.) of the steering assembly 320. Additionally or alternatively, the steering dampener 326 may be configured to apply a biasing force to bias the steering assembly 320 toward a central position (e.g., corresponding to travel in a straight direction).

Figure 9:
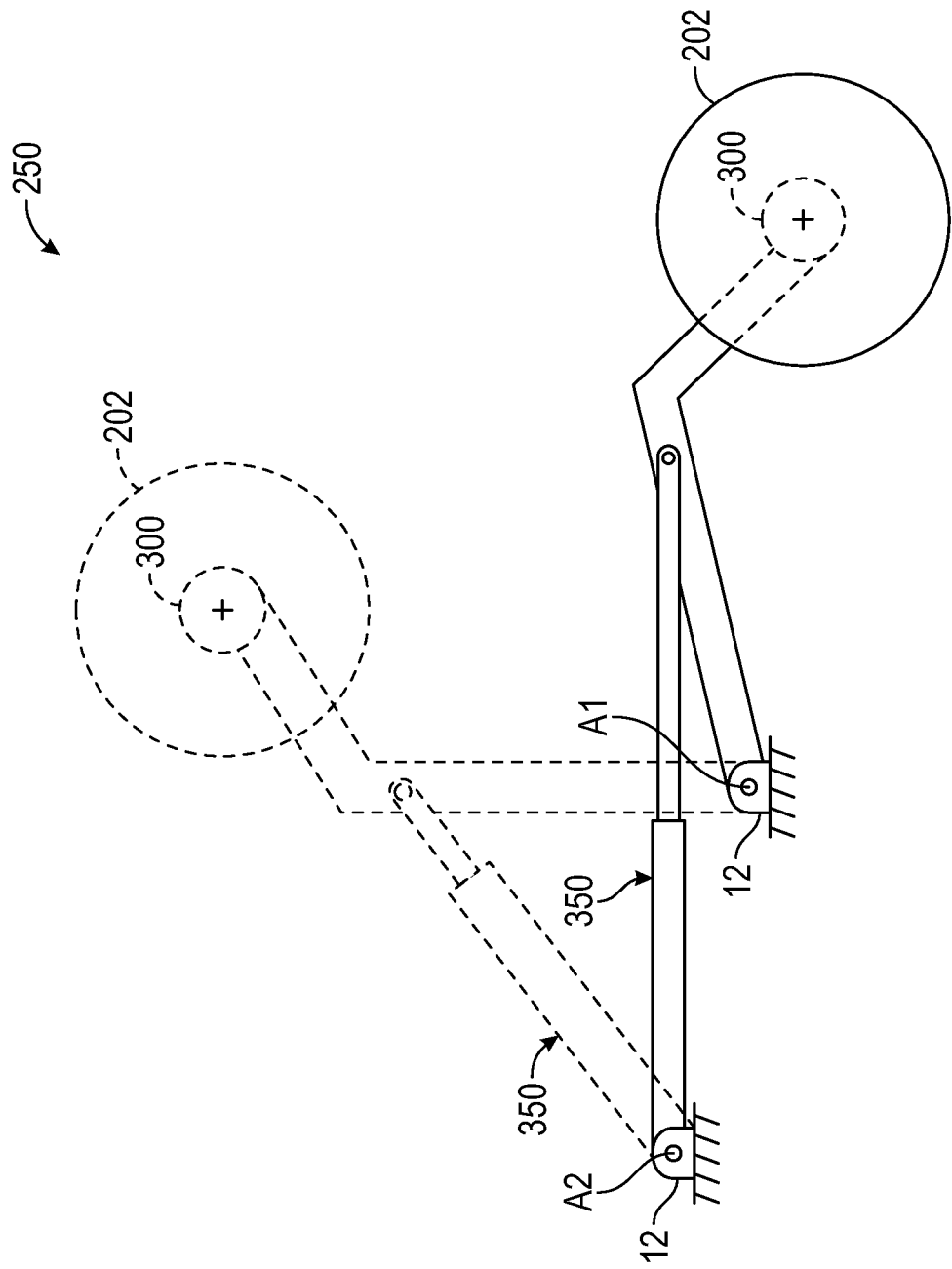
FIG. 9 is a right side view of a tag axle of the drivetrain of FIG. 5 in a raised configuration and a lowered configuration.

Referring to FIGS. 6 and 9, the concrete mixer truck 10 includes a tie pressure control system or central tire inflation (CTI) system, shown as CTI system 330. The CTI system 330 is configured to manage (e.g., control, increase, decrease, maintain at a desired setpoint) the tire pressure of each wheel 202. The CTI system 330 includes a compressed gas source, shown as compressor 332, configured to provide a supply of pressurized gas (e.g., air). The compressor 332 may be driven by the engine 16 or powered by electrical energy (e.g., from one or more energy storage devices or generators). The compressor 332 may communicate with one or more storage tanks for storage of the pressurized gas. In other embodiments, the compressed gas source is a prefilled tank of pressurized gas. The compressor 332 is fluidly coupled to each of the wheels 202 through one or more lines (e.g., conduits, hoses, pipe, etc.) and one or more tire pressure controllers, CTI system outputs, or valves, shown as tire pressure valves 334. The tire pressure valves 334 are configured to selectively permit pressurized gas to enter a corresponding wheel 202 to increase tire pressure. The tire pressure valves 334 are configured to selectively permit pressurized gas to exit a corresponding wheel 202 (e.g., into the atmosphere) to reduce tire pressure. In other embodiments, the CTI system 330 is omitted from the concrete mixer truck 10.

Referring to FIG. 7, the front tandem axle 220 is shown according to an exemplary embodiment. Except as otherwise specified, the front tandem axle 220 may be substantially similar to the front axle 210. Additionally, the front tandem axle 220 may be substantially similar to the rear tandem axle 230 except as otherwise specified. The axle main body 300 of the front tandem axle 220 includes the differential 270. The axle main body 300 of the rear tandem axle 230 includes the differential 272. In some embodiments, some or all of the axles of the concrete mixer truck 10 share the same brake controller 312 such that all of the brakes 310 activate simultaneously when a brake command is received.

The front tandem axle 220 omits the steering actuator 324 such that the steering of the front tandem axle 220 is not actively controlled. Instead, the steering dampener 326 and the dynamics of the wheels 202 and the steering assembly generally keep the wheels 202 centered and prevent oscillations. When concrete mixer truck 10 turns (e.g., as controlled by the front axle 210), the steering assembly 320 of the front tandem axle 220 permits the wheels 202 to passively turn. In other embodiments, the steering assembly 320 is omitted from the front tandem axle 220, and the wheels 202 maintain a constant (e.g., perpendicular) orientation relative to the axle main body 300.

Referring to FIG. 8, the pusher axle 240 is shown according to an exemplary embodiment. Except as otherwise specified, the pusher axle 240 may be substantially similar to the front tandem axle 220. In some embodiments, the pusher axle 240 is non-powered. Accordingly, the axle main body 300 omits the differential, and the wheels 202 may be permitted to spin freely relative to one another. As shown, the steering actuator 324 is omitted from the steering assembly 320. In other embodiments, the steering assembly 320 is omitted from the pusher axle 240, and the wheels 202 maintain a constant (e.g., perpendicular) orientation relative to the axle main body 300.

The pusher axle 240 further includes one or more (e.g., shown as two) actuators (e.g., axle lift actuators) or biasing members, shown as axle lifters 350. As shown, the axle lifters 350 are coupled to the frame 12 and the axle main body 300. The axle lifters 350 are configured to lift the axle main body 300 relative to the frame 12 (e.g., such that the wheels 202 are brought out of engagement with the ground). Each axle lifter 350 may include one or more hydraulic cylinders, pneumatic cylinders, air bags, electric motors, or other types of actuators. Each axle lifter 350 may include one or more biasing members or biasing elements (e.g., coil springs, leaf springs, gas springs, etc.). Each axle lifter 350 may include linkages, brackets, mounts, or coupling arrangements that facilitate coupling the axle lifter 350 to the frame 12 and/or the axle main body 300. As shown, the two axle lifters 350 are offset laterally along the length of the axle main body 300. Accordingly, each axle lifter 350 acts to primarily lift one of the wheels 202 (e.g., the wheel 202 closest to the axle lifter 350).

In some embodiments, the axle lifters 350 are actively controlled to selectively lift the wheels 202 out of contact with the ground. By way of example, a fluid (e.g., compressed gas, hydraulic oil, etc.) can be selectively added or removed from each axle lifter 350 to vary the displacement (e.g., length) of the axle lifter 350. The axle lifters 350 are coupled to the frame 12 and the axle main body 300 such that the displacement of each axle lifter 350 has a corresponding vertical position of the corresponding wheel 202. In some embodiments, the axle lifters 350 are generally selectively reconfigurable (e.g., selectively repositionable) between a lowered configuration in which the wheels 202 contact the ground and a raised configuration in which the wheels 202 are lifted out of contact with the ground.

As shown in FIG. 8, each axle lifter 350 is coupled (e.g., operatively, fluidly, etc.) to a lift control device, lift actuator controller, valve, or actuator, shown as axle lift controller 352. The axle lift controllers 352 are configured to control the position of the corresponding wheel 202 (e.g., between a raised or lifted position and a lowered or operation position) by varying the configuration (e.g., displacement) of the axle lifter 350. In some embodiments, the axle lift controller 352 includes one or more valves that control the flow of fluid into or out of the axle lifter 350. By including an axle lift controller 352 for each axle lifter 350, each wheel 202 can be independently lifted. In other embodiments, one of the axle lift controller 352 is omitted, and one axle lift controller 352 controls both axle lifters 350. In other embodiments, the pusher axle 240 includes only one axle lifter 350 and thus only one axle lift actuator controller.

In other embodiments, the axle lifter 350 includes a passive biasing member (e.g., a spring) that is configured to impart an upward biasing force on the axle main body 300. In such embodiments, the wheels 202 (e.g., and thus the pusher axle 240) may default to the raised configuration when the concrete mixer truck 10 is in an unpowered state. The wheels 202 may be forced downward to the lowered configuration by the suspension actuators 302. By way of example, the axle lifters 350 may include compression springs that apply a biasing force to the axle main body 300 to bias the axle main body 300 and the wheels 202 toward the raised position. The suspension actuators 302 may include air bags that, when supplied with pressurized air, overcome the biasing forces of the springs.

Referring to FIGS. 1, 2, and 9, the tag axle 250 is shown according to an exemplary embodiment. The tag axle 250 is shown in the lowered configuration in solid lines and in the raised configuration in dashed lines. In this embodiment, the tag axle 250 includes an axle lifter 350 that includes a frame assembly, shown as tag axle subframe 360, and an actuator, shown as hydraulic cylinder 362. The axle main body 300 is fixedly coupled to the tag axle subframe 360, and the suspension actuators 302 and the locks 306 are omitted. In other embodiments, the axle main body 300 is coupled to the tag axle subframe 360 by one or more suspension actuators. The tag axle subframe 360 is pivotally coupled to the frame 12 such that the tag axle subframe 360 is rotatable relative to the frame 12 about a lateral axis A1. Accordingly, the tag axle subframe 360 is rotated about the lateral axis A1 to raise or lower the wheels 202. A first end of the hydraulic cylinder 362 is pivotally coupled to the tag axle subframe 360, and an opposing second end of the hydraulic cylinder 362 is pivotally coupled to the frame 12. The hydraulic cylinder 362 is rotatable relative to the frame 12 about a lateral axis A2. To lower the wheels 202, the hydraulic cylinder 362 is extended, and to raise the wheels 202, the hydraulic cylinder 362 is retracted. The hydraulic cylinder 362 may be controlled by an axle lift controller 352 (e.g., a valve that selectively supplies pressurized hydraulic fluid from a pump to the hydraulic cylinder 362 to extend or retract the hydraulic cylinder 362).

Control System

Figure 10:
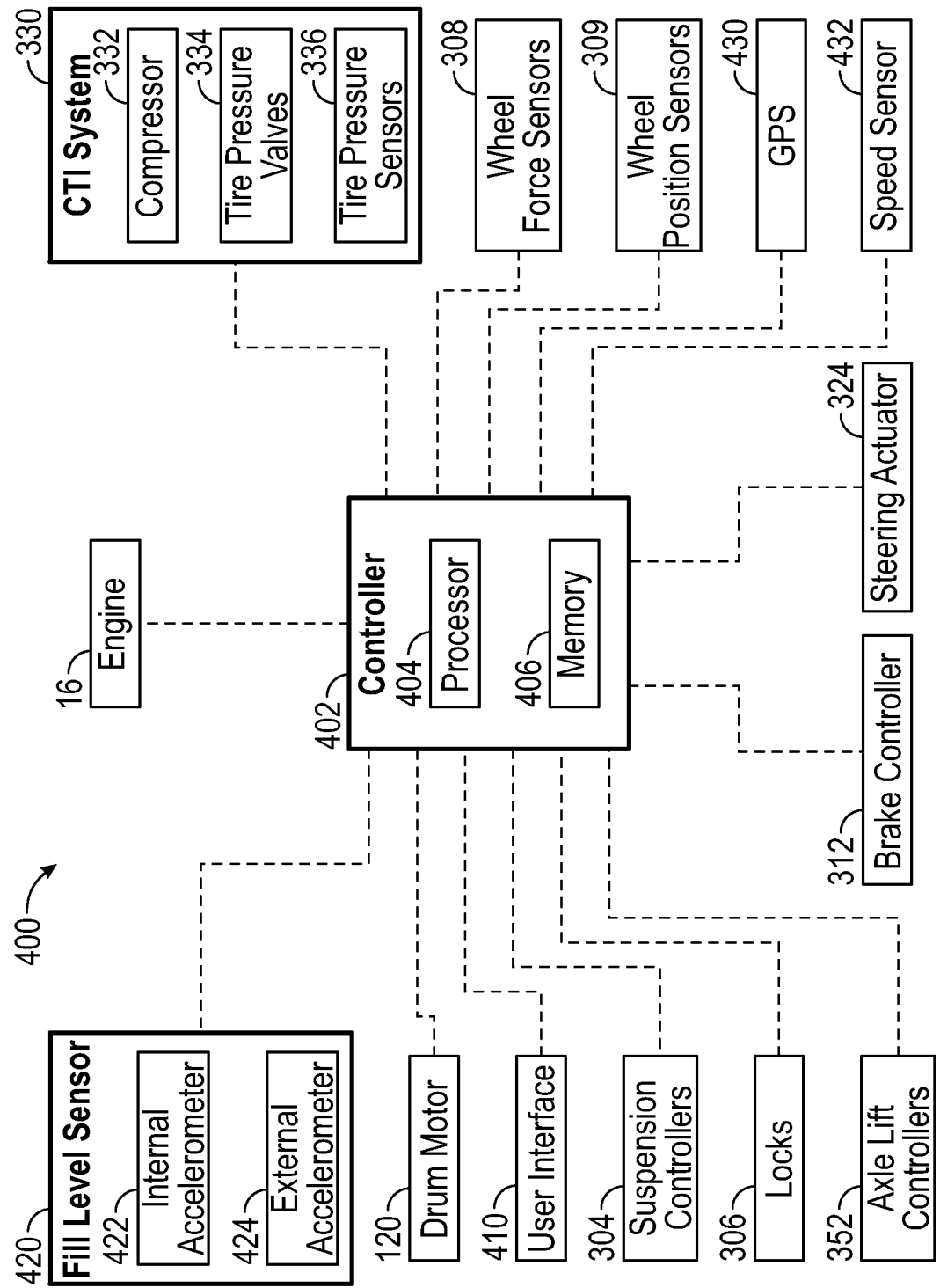
FIG. 10 is a block diagram of a control system of a concrete mixer truck.
Figure 11:
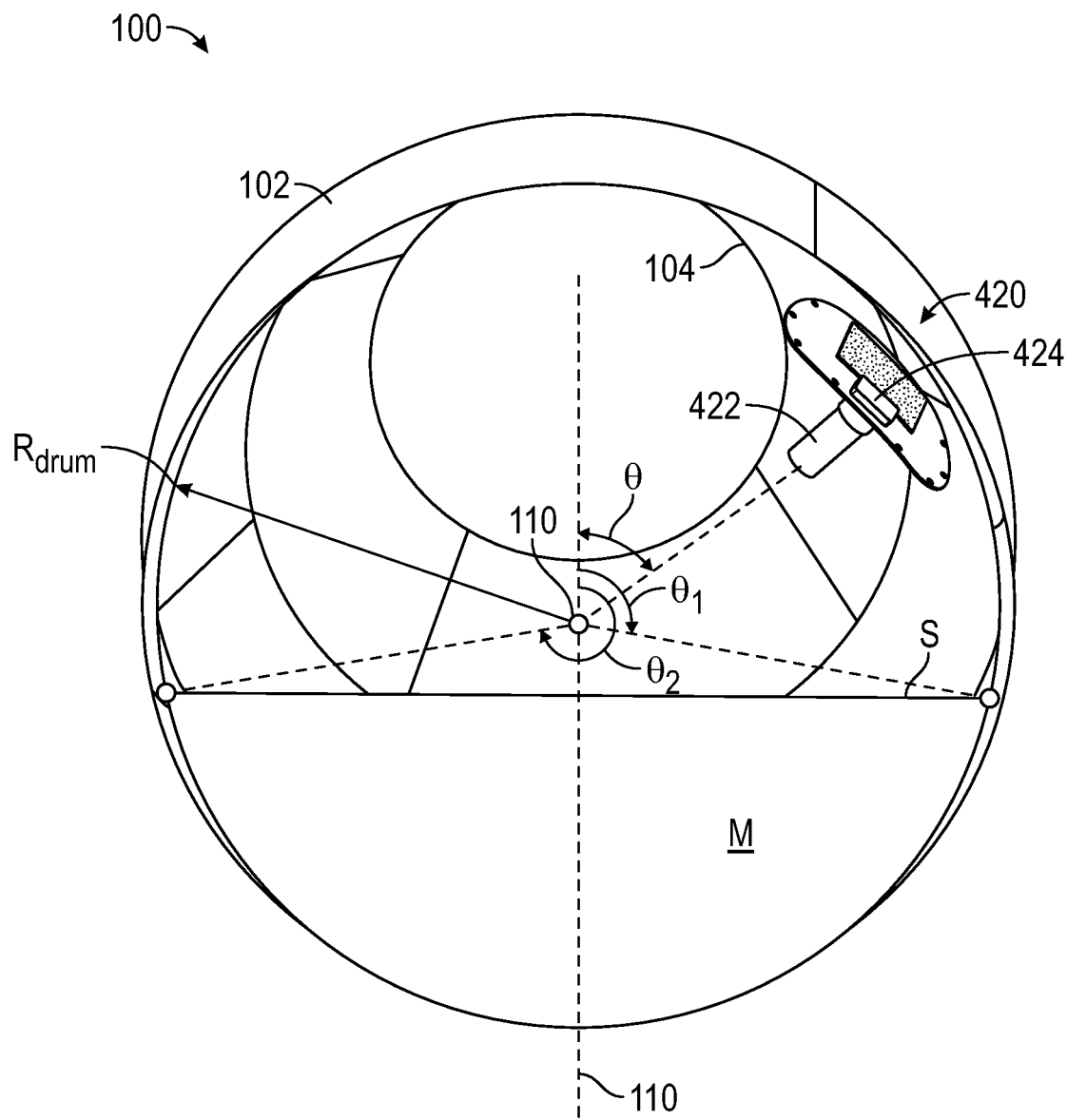
FIGS. 11-16 are front section views of the a concrete mixer drum of the concrete mixer truck of FIG. 1 in various rotational positions and at various fill levels.
Figure 12:
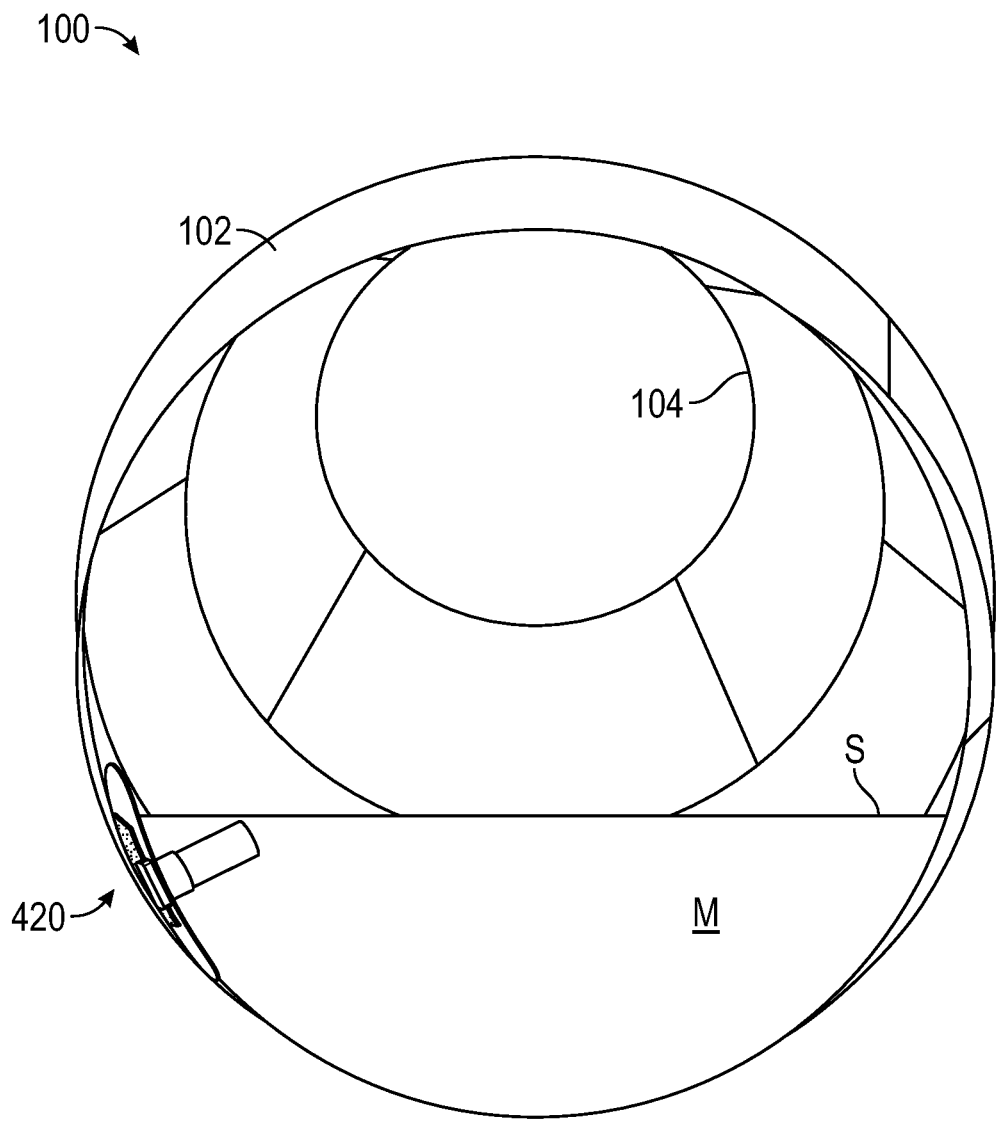
Figure 13:
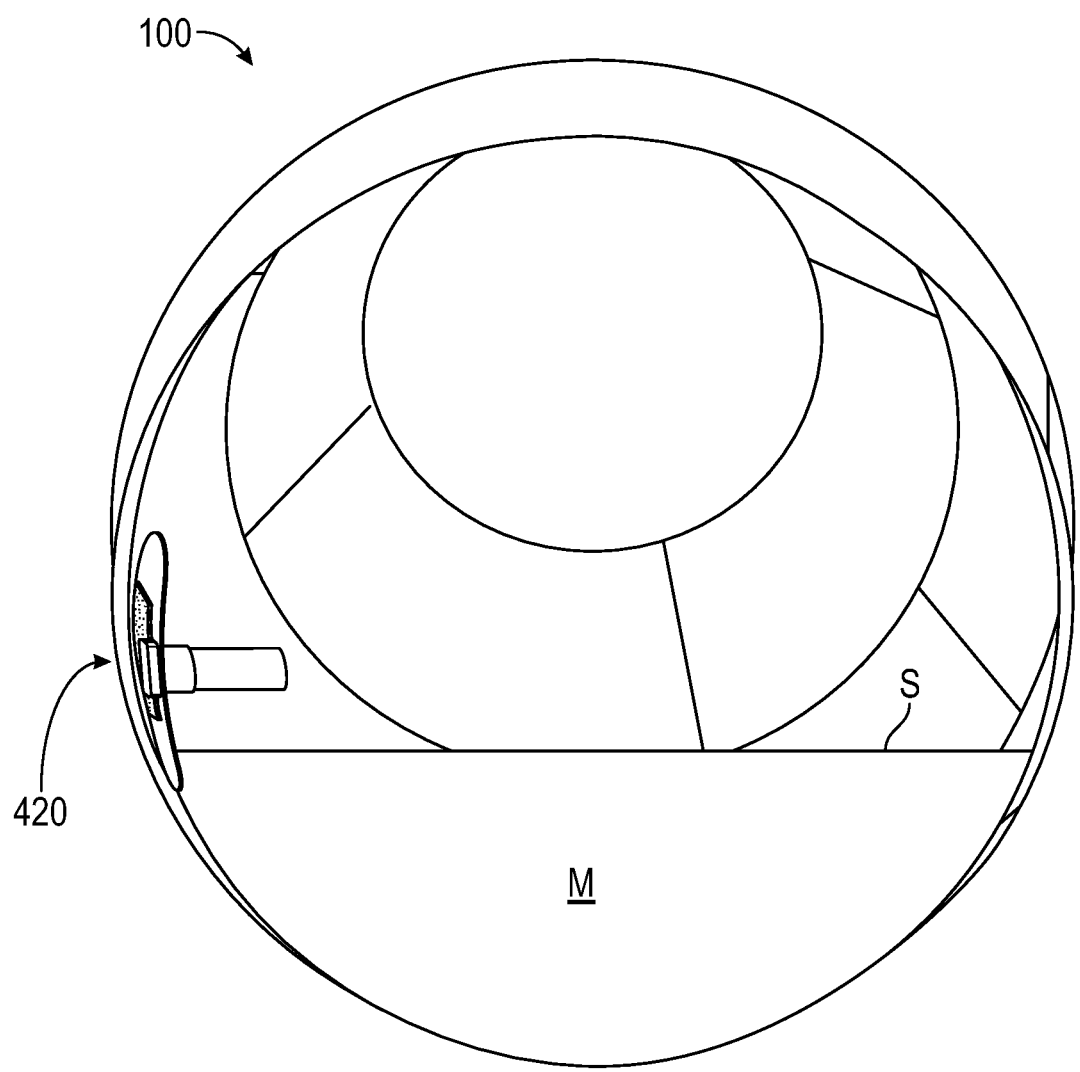
Figure 14:
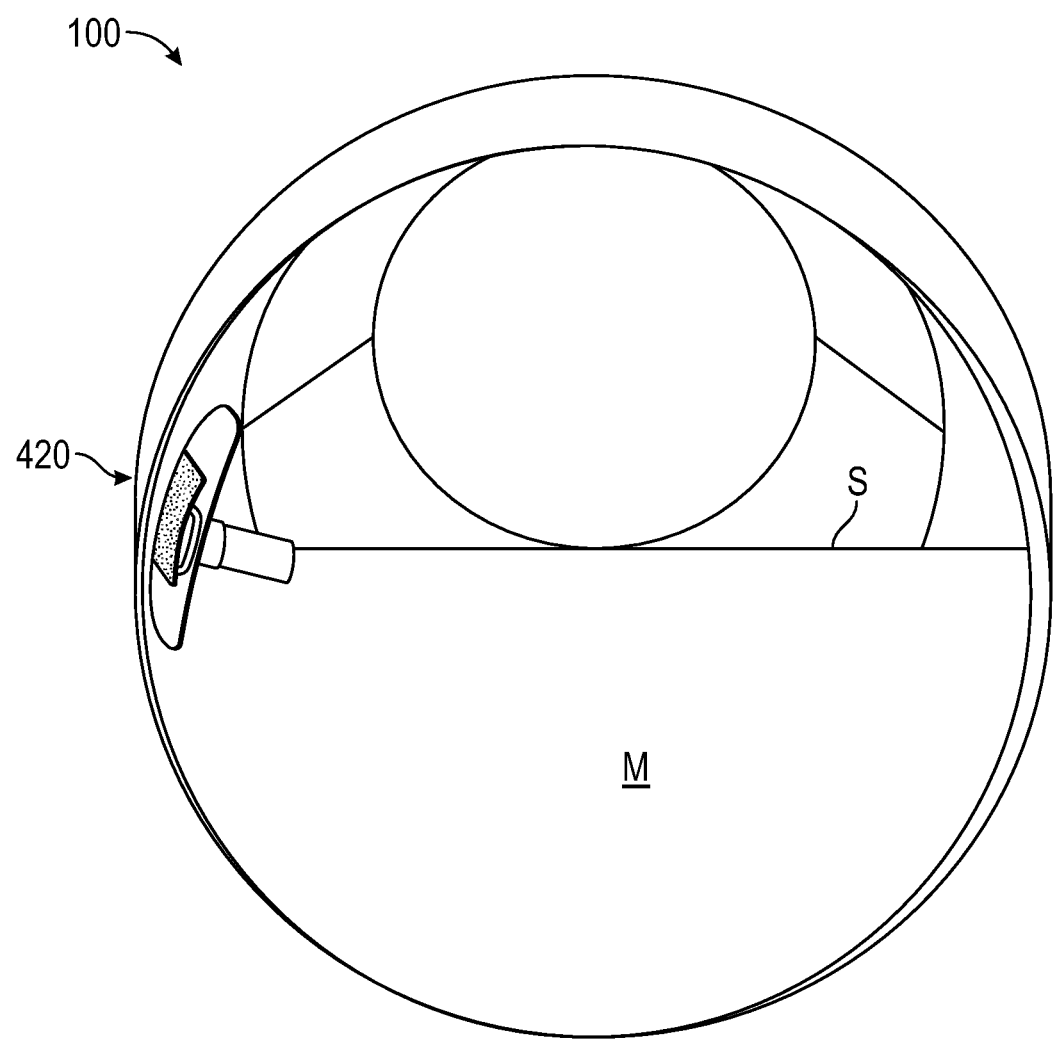
Figure 15:
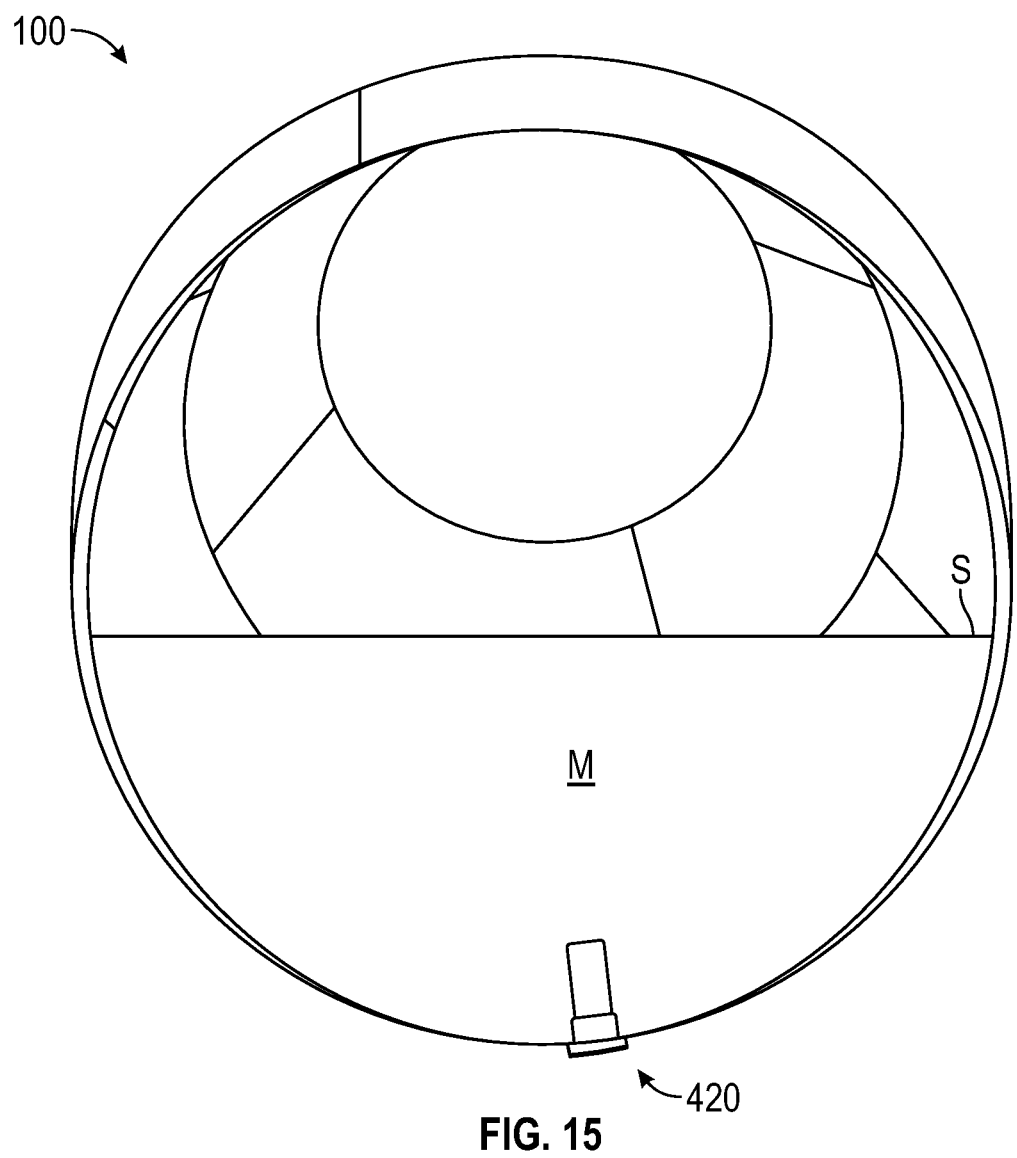
Figure 16:
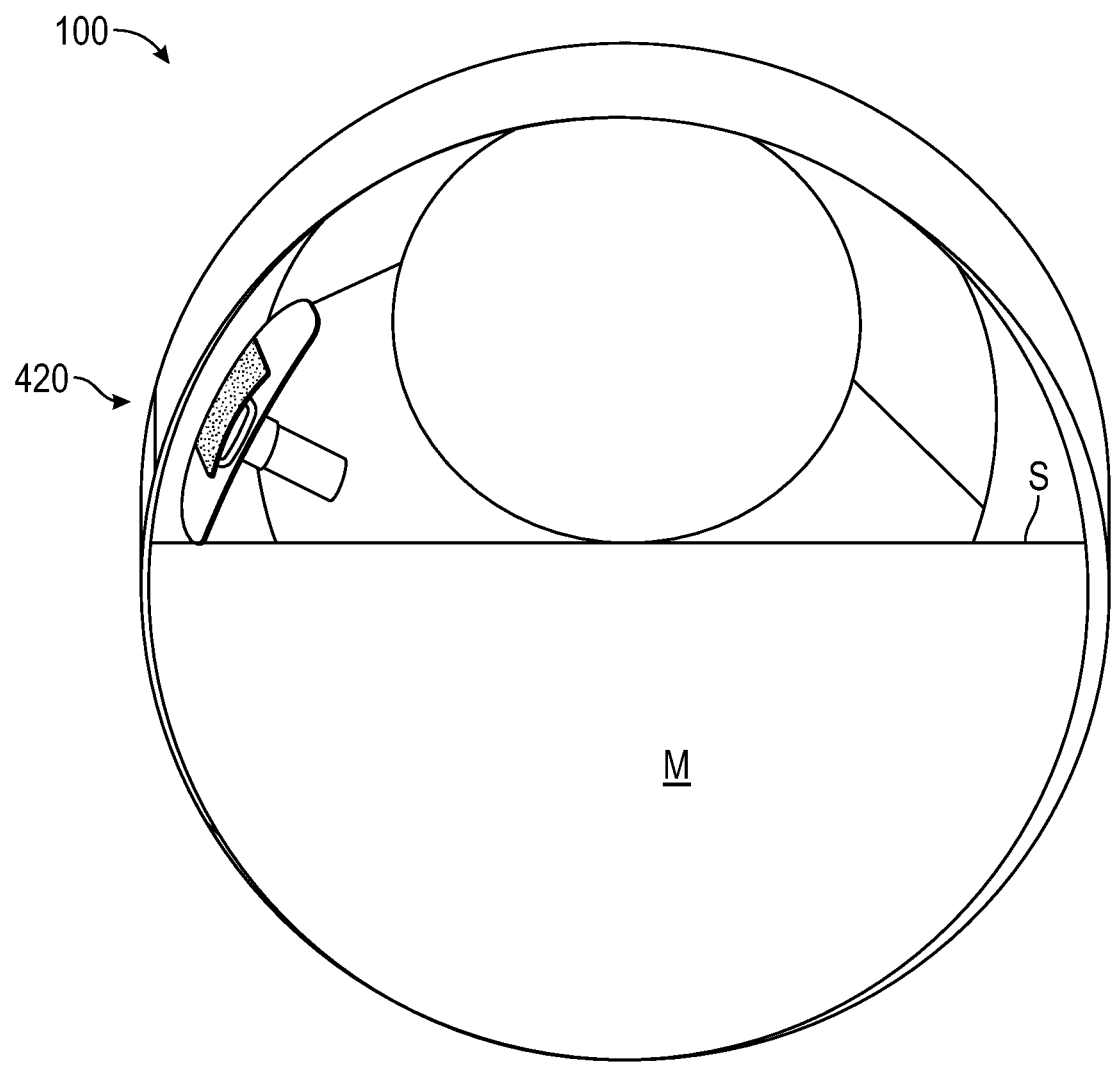

Referring to FIG. 10, the concrete mixer truck 10 includes a control system 400. The control system 400 includes a controller (e.g., an electronic controller) or processing circuit, shown as controller 402. The controller 402 includes a processor 404 and a memory device, shown as memory 406. The controller 402 may be configured to monitor and/or control various aspects of the concrete mixer truck 10. Specifically, the controller 402 may receive inputs from a variety of input devices, and provide commands to a variety of output devices. As shown in FIGS. 6-9, the controller 402 provides outputs to one or more of: the engine 16; the drum motor 120; a user interface 410; the suspension controllers 304; the locks 306; the axle lift controllers 352; the brake controller 312; the steering actuator 324; the compressor 332; the tire pressure valves 334; or other output devices. The controller 402 receives inputs from one or more of: the engine 16; the user interface 410; a fill level sensor 420; wheel force sensors 308; wheel position sensors 309; tire pressure sensors 336; a global positioning system (GPS) 430; a speed sensor 432; or other input devices. In one embodiment, the controller 402 is onboard the concrete mixer truck 10. In other embodiments, at least a portion of the control system 400 (e.g., controller 402 a second controller 402, another processing circuit, etc.) is disposed in a location that is remote from the concrete mixer truck 10.

Wheel Force Sensors

Referring to FIG. 10, the control system includes input devices, pressure sensors, or force sensors, shown as wheel force sensors 308, operatively coupled to the controller 402. Each wheel force sensor 308 is associated with one of the wheels 202 and/or one of the axle assemblies. Specifically, each wheel force sensor 308 is configured to provide a signal indicative of the weight supported by each wheel 202 and/or the total weight supported by one of the axle assemblies. Additionally or alternatively, the signal may indicate the force separating each wheel 202 and/or one of the axle assemblies from the frame 12. In some embodiments, the wheel force sensor 308 includes a pressure sensor that measures a pressure within the suspension actuator 302 or the axle lifter 350 associated with a wheel 202 and/or an axle. The relationship between this pressure and the weight supported by the corresponding wheel 202 and/or axle may be predetermined and stored in the memory 406. In some embodiments, the wheel force sensor 308 includes a load cell or other force transducer that measures a force on a component of the axle (e.g., a force applied by the suspension actuator 302 and/or the axle lifter 350, a force on the axle main body 300. The relationship between this force and the weight supported by the corresponding wheel 202 and may be predetermined and stored in the memory 406. In some embodiments, the wheel force sensor 308 includes a strain gauge configured to measure a strain experienced by a component of the axle assembly. The relationship between this strain and the weight supported by the corresponding wheel 202 and/or axle may be predetermined and stored in the memory 406. The controller 402 (onboard the concrete mixer truck 10 and/or a processing circuit disposed in a location that is remote from the concrete mixer truck 10, in which case the signals from one or more of the sensors may be transmitted to the remote processing circuit, processed by the remote processing circuit, and command signals may thereafter be provided from the remote processing circuit to the concrete mixer truck to actuate one or more components) may use the wheel force sensors 308 to provide closed loop control of the suspension actuators 302 (e.g., using the suspension controllers 304) and/or the axle lifters 350 (e.g., using the axle lift controllers 352) to achieve a target weight supported by each wheel 202 or axle.

Wheel Position Sensors

Referring still to FIG. 10, the control system 400 includes input devices, position sensors, length sensors, or displacement sensors, shown as wheel position sensors 309, operatively coupled to the controller 402. The wheel position sensors 309 are configured to provide a signal indicative of a position of each wheel 202 and/or axle relative to the frame 12. The wheel position sensors 309 may include one or more position or length sensors (e.g., linear variable differential transformers (LVDTs), potentiometers, ultrasonic distance sensors, etc.) that measure at least one of (a) the displacement of a component or (b) the relative position of two components. The relationship between this measured value and the position of a corresponding wheel 202 and/or axle may be predetermined and stored in the memory 406. The controller 402 may use the wheel position sensors 309 to provide closed loop control of the suspension actuators 302 and/or the axle lifters 305 to achieve a target axle or wheel 202 position. By performing this across multiple axles, the controller 402 may achieve a target ride height.

Tire Pressure Sensors

The control system 400 further includes a series of pressure sensors, shown as tire pressure sensors 336, operatively coupled to the controller 402. The tire pressure sensors 336 are configured to provide a signal indicative of the pressure within the tire of a corresponding wheel 202. The controller 402 may use the tire pressure sensors 336 in conjunction with the compressor 332 and/or the tire pressure valves 334 to provide closed loop control of the tire pressure of each wheel 202 (e.g., individually). By way of example, the controller 402 may open a tire pressure valve 334 and activate the compressor 332 to increase the pressure within a tire of a corresponding wheel 202 until the corresponding tire pressure sensor 336 indicates that a target tire pressure has been reached.

User Interface

Referring to FIG. 10, the control system 400 includes an input device, output device, input/output device, or user interface, shown as user interface 410. The user interface 410 is configured to facilitate interaction between a user (e.g., the driver) and the control system 400. The user interface 410 may provide information to a user. By way of example, the user interface 410 may include lights, speakers, gauges, displays (e.g., LCD displays, LED displays, etc.), haptic feedback devices, or other devices capable of conveying information to a user. The user interface 410 may additionally or alternatively receive information (e.g., commands) from a user and provide the information to the controller 402. By way of example, the user interface 410 may include switches, buttons, pedals, knobs, wheels, touch screens, touch pads, microphones, or other devices. The user interface 410 may include user devices (e.g., smartphones, laptop computers, tablets, etc.) in communication with the controller 402 (e.g., through a wireless communication protocol, such as Bluetooth).

Fill Level Sensor

Referring to FIG. 10, the control system 400 includes a sensor or sensing system (e.g., a drum fill level sensor, a weight sensor, a volume sensor, etc.), shown as fill level sensor 420, operatively coupled to the controller 402. The fill level sensor 420 is configured to provide one or more signals indicative of an amount of material in the mixing drum 102 (i.e., a fill level of the mixing drum 102). By way of example, the fill level sensor 420 may provide a signal indicative of the weight of the material in the mixing drum 102. By way of another example, the fill level sensor 420 may provide a signal indicative of a volume of the material within the mixing drum 102 (i.e., an occupied volume of the mixing drum 102). By way of another example, the fill level sensor 420 may provide a signal indicative of a height of the material within the mixing drum 102.

One embodiment of the fill level sensor 420 is shown in FIGS. 4 and 11-16. In this embodiment, the fill level sensor 420 includes a sensor assembly (e.g., a probe) that extends radially into the mixing drum 102. As the mixing drum 102 rotates, the fill level sensor 420 is configured to move around the circumference of the internal volume of the mixing drum 102. When material M is present in the mixing drum 102, the fill level sensor 420 moves into and out of contact with (e.g., periodically becomes immersed in) the material M. The point at which the fill level sensor 420 becomes immersed in the material M varies based on a fill level of the mixing drum 102. As shown in FIGS. 11-16, as a volume $V_{material}$ of the material M in the mixing drum 102 increases, the height of a top surface S increases, and the sensor assembly is in contact with the material M for a greater portion of each revolution.

The fill level sensor 420 is configured to provide a signal indicative of the whether or not the sensor is contacting (e.g., immersed in) material M within the mixing drum 102. As the mixing drum 102 rotates, the controller 402 monitors an angle $\ominus$ of the mixing drum 102. This angle measurement may be provided by the fill level sensor 420. Alternatively, a separate rotational position sensor may be used to monitor a rotational position of the mixing drum 102. When the fill level sensor 420 first indicates contact with the material M, the fill level sensor 420 is at a top surface S of the material M, and the controller 402 records an angle $\ominus_1$ of the fill level sensor 420. When the fill level sensor 420 stops indicating contact with the material M, the fill level sensor 420 is again at the top surface S of the material M, and the controller records an angle $\ominus_2$ of the fill level sensor 420.

In some embodiments, the controller 402 uses the angle $\Theta_1$ and/or the angle $\Theta_2$ to determine the fill level of the mixing drum 102. By way of example, a relationship between the angle $\Theta_1$ and/or the angle $\Theta_2$ and the fill level of the mixing drum 102 may be predetermined and stored in the memory 406. In some embodiments, this relationship is approximated using a function such as:

$$V_{material} = f_{volume}(\Theta_1, \Theta_2, R_{drum}, V_{drum})$$

where $V_{material}$ is a volume of the material M present in the mixing drum 102, $R_{drum}$ is a radius of the mixing drum 102, and $V_{drum}$ is a volume of the mixing drum 102. In some embodiments, function $f_{volume}$ is determined using empirical data. In some embodiments, function $f_{volume}$ is determined based on geometric relationships of mixing drum 102.

Once the volume $V_{material}$ has been determined, the volume $V_{material}$ may be multiplied by a density $\rho_{material}$ of the material M to determine a weight $W_{material}$ of the material M. In some embodiments, the density material $\rho_{material}$ is predetermined (e.g., assumed) and stored in the memory 406. In other embodiments, the controller 402 is operatively coupled to a sensor that provides a signal indicative of the density $\rho_{material}$. Once the weight $W_{material}$ has been determined, the controller 402 may combine the weight $W_{material}$ of the material M with a weight of the concrete mixer truck 10 to determine a gross weight of the concrete mixer truck 10. The weight of the concrete mixer truck 10 may be predetermined and stored in the memory 406.

In the embodiment shown in FIGS. 4 and 11-16, the fill level sensor 420 includes a first accelerometer, shown as internal accelerometer 422, and a second accelerometer, shown as external accelerometer 424. As shown, the internal accelerometer 422 and the external accelerometer 424 are radially offset from one another relative to the axis 110 of the mixing drum 102. The external accelerometer 424 is positioned such that it measures a baseline acceleration signal. For example, the external accelerometer 424 may be positioned outside of the mixing drum 102, inside the mixing drum 102 in an enclosure, etc. The internal accelerometer 422 is positioned such that it passes through the material M present in the mixing drum 102. Specifically, the internal accelerometer 422 is positioned at the end of a cantilevered protrusion, shown as probe 426, that extends radially inward from a wall of the mixing drum 102. The internal accelerometer 422 measures acceleration signals which are disturbed (e.g., experience noise or vibrations) as the probe 426 passes through the material M. The internal accelerometer 422 and the external accelerometer 424 may be three-axis accelerometers, configured to measure radial, tangential, and lateral acceleration.

As the mixing drum 102 rotates, the measured radial and tangential acceleration changes according to a sinusoidal shape due to the changing amounts of gravitational acceleration measured in the radial and tangential directions. As the mixing drum 102 rotates and the internal accelerometer 422 passes through the material M, the internal accelerometer 422 produces disturbed/noisy acceleration signals. Since the external accelerometer 424 is outside of the mixing drum 102 or positioned such that it does not pass through the material M, the external accelerometer 424 produces undisturbed/baseline acceleration signals. The controller 402 analyzes (e.g., compares) the disturbed acceleration signals and the undisturbed acceleration signals, and based on the analysis of the disturbed/undisturbed acceleration signals can determine whether or not the fill level sensor 420 is contacting the material M. Additionally, the controller 402 may analyze the acceleration of the external accelerometer 424 to determine the direction of gravitation acceleration relative to the fill level sensor 420, and based on this direction determine the angle $\Theta$ of the fill level sensor 420 (e.g., because gravitational acceleration has a constant downward direction).

In other embodiments, the fill level sensor 420 includes a different type of sensor configured to determine the fill level of the mixing drum 102. By way of example, the fill level sensor 420 may include a weight sensor or force sensor (e.g., a load cell) configured to measure a weight of the mixing drum 102 and the material contained within the mixing drum 102. Such as sensor may be coupled to one of the pedestals.

Global Positioning System (GPS)

In some embodiments, the control system includes an input device, vehicle position sensor, or location sensor, shown as global positioning system (GPS) 430, operatively coupled to the controller 402. The GPS 430 is configured to provide a location of the concrete mixer truck 10 in a frame of reference. In some embodiments, the GPS 430 provides the location of the concrete mixer truck 10 relative to the surface of the Earth. The GPS 430 may communicate with one or more satellites cellular network towers, or other devices to determine this location. In some embodiments, the controller 402 utilizes the location provided by the GPS 430 to determine the heading (e.g., direction of travel) and speed (e.g., rate of travel) of the concrete mixer truck 10.

Speed Sensor

In some embodiments, the control system 400 includes a rate of travel sensor, shown as speed sensor 432. The speed sensor 432 is configured to provide a signal indicative of a current speed of travel of the concrete mixer truck 10. The speed sensor 432 may also provide a direction of travel of the concrete mixer truck 10 (e.g., forward, reverse, etc.). In some embodiments, the speed sensor 432 includes an accelerometer configured to measure an acceleration of the concrete mixer truck 10. The controller 402 may then use the acceleration to determine the speed of the concrete mixer truck 10 (e.g., by integration over time). The accelerometer may be coupled to the frame 12, the cab 14, or to another part of the concrete mixer truck 10. In some embodiments, the speed sensor 432 includes a rotation sensor (e.g., an encoder, a Hall-effect sensor, etc.) configured to measure rotation (e.g., a rotation position, a rotational speed, etc.) of a component of the drivetrain 200. By way of example, the rotation sensor may be coupled to an output of the transmission 260, to one of the driveshafts, to one of the wheels 202, or to another rotating component. A ratio between the rotation of that component and the distance traveled may be predetermined (e.g., based on a circumference of the corresponding wheel 202 and any intervening gear ratios) and stored in the memory 406. The controller 402 may then use the ratio to determine the speed of the concrete mixer truck 10. In other embodiments, the GPS 430 provides the speed of the concrete mixer truck 10, and the speed sensor 432 is omitted.

Control Logic

Determination of Operational Requirements

Figure 17:
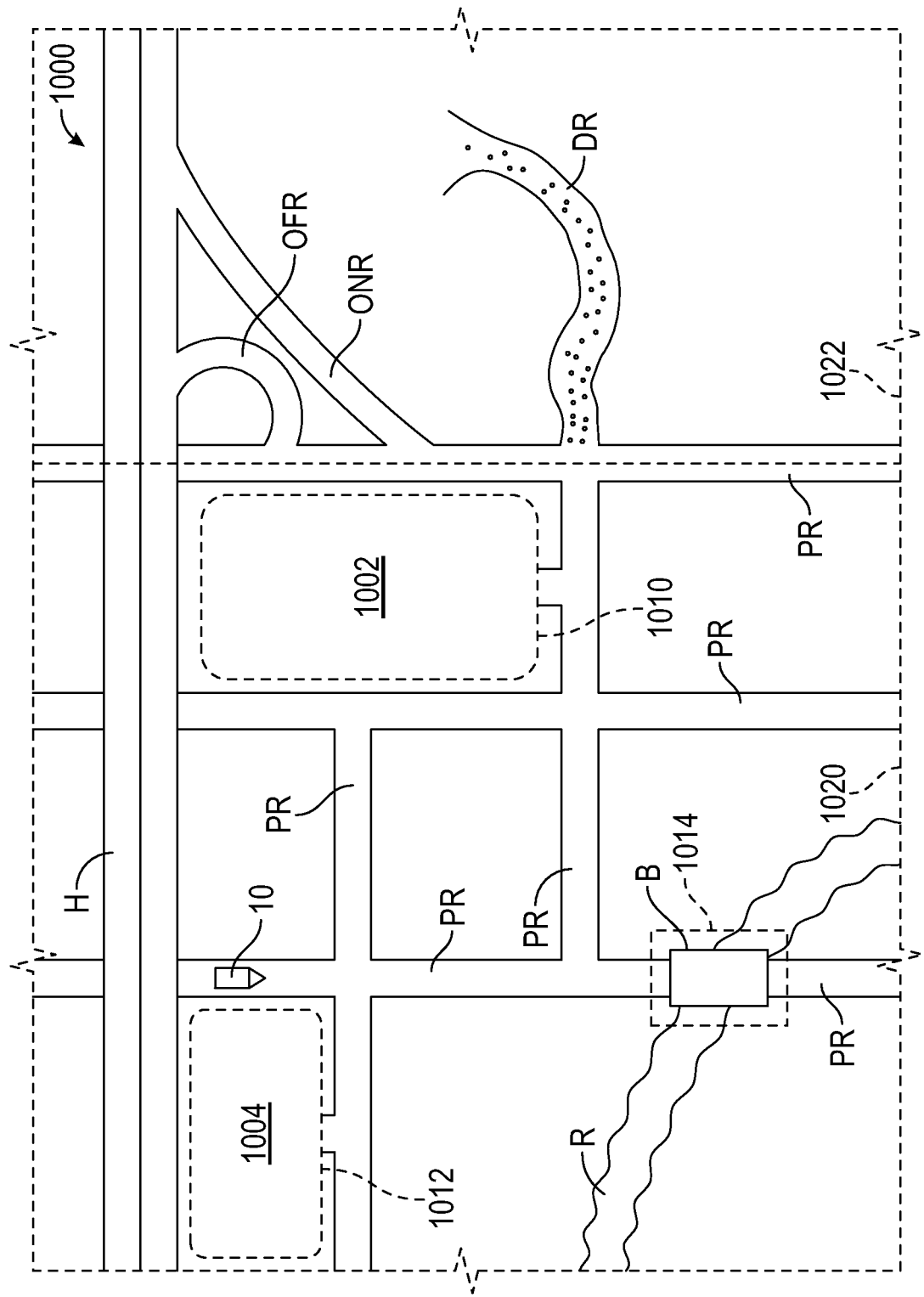
FIG. 17 is a top view of a map including a variety of geofences, according to an exemplary embodiment.

In some embodiments, the memory 406 includes a database or module that stores the locations of various road features that may be encountered by the concrete mixer truck 10. These road features may include roads (e.g., unpaved roads, paved roads, highways, etc.), intersections, buildings, parking lots, bridges, train tracks, lakes, rivers, hills, mountains, gates, tollbooths, or other features. FIG. 17 illustrates a map 1000 of an area with such features. Specifically, the map 1000 includes paved roads PR, a highway H having an on ramp ONR and an off ramp OFR, a series of paved roads PR, an unpaved dirt road DR, and a bridge B spanning a river R. The memory 406 may also store one or more locations of relevance to the concrete mixer truck 10. By way of example, the memory 406 may store the locations of one or more staging areas where the mixing drum 102 is filled with material (e.g., from a concrete batch plant located at the staging area). By way of another example, the memory 406 may store the locations of one or more job sites where the concrete mixer truck 10 is intended to deliver or dispense concrete. The map 1000 illustrates a job site 1002 and a staging area 1004.

In some embodiments, the memory 406 includes a database or module that stores one or more operational requirements associated with a particular area or road feature. These operational requirements may specify how the vehicle is permitted to operate. By way of example, the operational requirements may include a maximum weight supported by each axle, a maximum weight supported by each wheel 202, a maximum gross weight of the concrete mixer truck 10, a requirement for the lift axles to be raised or lowered, or other requirements. These requirements may be governed by a regulatory body, such as a government (e.g., a state, local, or national government), or may be specified by a user (e.g., for a job site). By way of example, the memory 406 may store operational requirements (e.g., a maximum weight supported by each axle) for a given jurisdiction (e.g., country, state, city, township, or other area). By way of another example, the memory 406 may store operational requirements for a user-defined area (e.g., the job site 1002, the staging area 1004, etc.). In one such example, the memory 406 may indicate that the maximum weight per axle is permitted to be higher than on the surrounding paved roads, such that the lift axles can be raised when entering the job site 1002 or the staging area 1004.

In some embodiments, the controller 402 defines boundaries or geofences around certain areas or features. By using the location of the concrete mixer truck 10 (e.g., as provided by the GPS 430), the controller 402 may determine if the concrete mixer truck 10 has passed through a geofence into a particular area. Based on this determination, the controller 402 may then utilize the operational requirement data stored in the memory 406 to determine what operational requirements apply to the concrete mixer truck 10 at the current location. The geofences may be defined along the boundary of a country, state, city, country, township, or other area subject to the governance of a particular regulatory body. The geofences may be defined around an object. By way of example, a geofence may be defined around a bridge, along a road, or around another type of road feature. A geofence may conform to the shape of the feature, or may have a predefined shape (e.g., a circle having a predetermined radius around a center point). A geofence may be defined by a user (e.g., surrounding a job site or a staging area).

In FIG. 17, the map 1000 includes a series of geofences illustrated as dashed lines. A first geofence, shown as job site geofence 1010, surrounds the job site 1002. Accordingly, when the concrete mixer truck 10 is determined to be within the area defined by the job site geofence 1010, the controller 402 may determine that the operational requirements associated with the job site 1002 apply. A second geofence, shown as staging area geofence 1012, surrounds the staging area 1004. Accordingly, when the concrete mixer truck 10 is determined to be within the area defined by the staging area geofence 1012, the controller 402 may determine that the operational requirements associated with the staging area 1004 apply. A third geofence, shown as bridge geofence 1014, surrounds the bridge B. Accordingly, when the concrete mixer truck 10 is determined to be within the area defined by the bridge geofence 1014, the controller 402 may determine that the operational requirements associated with the bridge B apply.

An additional set pair of geofences are included in FIG. 17 to represent the boundaries between two areas under different governmental control. Specifically, a first state boundary, shown as state geofence 1020, represents a first state (e.g., Wisconsin), and a second state boundary, shown as state geofence 1022, represents a second state (e.g., Illinois). When the concrete mixer truck 10 is determined to be within the area defined by the state geofence 1020, the controller 402 may determine that the operational requirements associated with the first state apply. When the concrete mixer truck 10 is determined to be within the area defined by the state geofence 1022, the controller 402 may determine that the operational requirements associated with the second state apply.

In certain situations, multiple sets of operational requirements may apply simultaneously. By way of example, the concrete mixer truck 10 may be positioned within the bridge geofence 1014, which is contained within the state geofence 1020. In some embodiments, the controller 402 compares each of the applicable requirements and selects (e.g., utilizes) the most stringent requirements that apply to the current location. By way of example, the operational requirements for passing over the bridge B may be more stringent than the operational requirements that apply generically to all of the roads within the first state. Accordingly, the controller 402 may select the operational requirements for the bridge B when positioned within the bridge geofence 1014. In some embodiments, the controller 402 identifies certain areas as being overriding areas. By way of example, the job site 1002 and the staging area 1004 may be considered overriding areas. When in an overriding area, the controller 402 may select the operational requirements associated with that area, regardless of what other operational requirements may apply. By way of example, when on the job site 1002, the operational requirements may be less stringent than those associated with the first state. However, because the job site 1002 is privately owned and does not include any state roads, the concrete mixer truck 10 may not be required to comply with the operational requirements associated with the first state when within the job site geofence 1010.

Lift Axle Position

In some embodiments, the controller 402 is configured to control operation of the suspension actuators 302 and/or the axle lifter 350 (e.g., through the suspension controller 304 and/or the axle lift controller 352) to move the lift axles (e.g., the pusher axle 240 and/or the tag axle 250) between the raised configuration (e.g., the raised position) and the lowered configuration (e.g., the lowered position). The controller 402 may control each axle individually, or the controller 402 may control all of the lift axles simultaneously.

In some embodiments, the controller 402 controls the positions of the lift axles based on a user input through the user interface 410. By way of example, the user interface 410 may include individual controls (e.g., buttons, switches, touch screen buttons, etc.) that, when interacted with by an operator, move one or more of the lift axles to the raised position or the lowered position. The user interface 410 may be configured to receive commands to control each lift axle individually (e.g., include two buttons with the text "raise/lower pusher axle" and "raise/lower tag axle," respectively, etc.). Additionally or alternatively, the user interface 410 may be configured to receive commands to control the lift axles simultaneously (e.g., include two buttons with the text "raise all lift axles" and "lower all lift axles," respectively, etc.).

In some embodiments, the controller 402 controls the positions of the lift axles based on the fill level of the mixing drum 102. The fill level may be determined based on information from the fill level sensor 420. Accordingly, the controller 402 may control the positions of the lift axles based on information from the fill level sensor 420. When the fill level is below a certain point (e.g., the mixing drum 102 is empty, the mixing drum 102 is only partially filled, etc.), the weight of the material in the mixing drum 102 may not be sufficient to necessitate the use of the lift axles. Accordingly, the lift axles may be held in the raised position, reducing wear on the lift axles and improving fuel economy. As the fill level increases, the weight of the material increases, increasing the weight supported by each axle. To reduce the weight supported by each axle, one or more of the lift axles may be lowered to distribute the gross weight of the concrete mixer truck 10 and the material in the mixing drum 102 across a greater number of axles.

In some embodiments, the controller 402 defines a series of threshold fill levels (e.g., each corresponding to a threshold material volume and a threshold material weight). When the controller 402 determines that the fill level exceeds a first threshold fill level, the controller 402 may control one or more of the lift axles to move to the lowered position. In some embodiments, the controller 402 lowers all of the lift axles (e.g., a pusher axle 240 and a tag axle 250, multiple pusher axles 240, multiple tag axles 250, multiple pusher axles 240 and multiple tag axles 250, etc.) in response to the fill level exceeding the first threshold fill level. In other embodiments, the controller 402 defines additional threshold fill levels greater than the first threshold fill level (e.g., a second threshold fill level, a third threshold fill level, etc.). By way of example, the first fill level threshold may be when the mixing drum 102 is 50% full, and the second fill level threshold may be when the mixing drum 102 is 80% full. When the fill level exceeds each subsequent threshold fill level, the controller 402 may control additional lift axles to move to the lowered positions. Similarly, the controller 402 may raise the lift axles when the fill level decreases below a threshold fill level. This process may occur automatically (e.g., without requiring input from an operator). Accordingly, the controller 402 can automatically control the axles to redistribute the load as required to support the gross weight of the concrete mixer truck 10 as material is added or removed from the mixing drum 102.

In some embodiments, the controller 402 controls the positions of the lift axles based on a location of the concrete mixer truck 10. This location may be determined based on information from the GPS 430. Accordingly, the controller 402 may control the positions of the lift axles based on information from the GPS 430. In some embodiments, the controller 402 determines one or more operational requirements relating to the axle position based on the location (e.g., using one or more geofences). By way of example, the operational requirements may require that the lift axles be in the raised position or in the lowered position regardless of the gross weight of the vehicle. By way of another example, the operational requirements may require a certain maximum weight be supported by each axle. In such an embodiment, the controller 402 may utilize the fill level sensor 420 to determine a gross weight of the concrete mixer truck 10. By way of example, the controller 402 may utilize the fill level sensor to determine the weight of the material of the mixing drum 102 and calculate the gross weight of the concrete mixer truck 10 as a sum of the weight of a the material and a predetermined weight of the concrete mixer truck 10. Based on this gross weight, the controller 402 may determine the weight supported by each axle. If the weight supported by any axle is greater than what is allowed by the operational requirements, the controller 402 may lower one or more of the lift axles distribute the weight across a greater number of axles. Alternatively, a relationship between the fill level and the weight supported by each axle may be predetermined, and the controller 402 may modify the threshold fill levels based on the operational requirements of the current location.

In some embodiments, the controller 402 controls the positions of the lift axles based on a speed of the concrete mixer truck 10. The speed of the concrete mixer truck 10 may be provided by the GPS 430 and/or the speed sensor 432. Accordingly, the controller 402 may control the positions of the lift axles based on an input from the GPS and/or the speed sensor 432. Specifically, the controller 402 may be configured to automatically lower one or more lift axles to the lowered position when the concrete mixer truck 10 exceeds a threshold speed. Exceeding this threshold speed may indicate that the concrete mixer truck 10 is now traveling down a road or a highway and is no longer present at a job site. In some embodiments, this speed-based control of the lift axle position may be used to override a location-based control of the lift axle position. By way of example, the controller 402 may determine that the GPS 430 is errantly indicating that the concrete mixer truck 10 is present at a job site when the speed exceeds the threshold speed. In some embodiments, this speed-based control of the lift axle position is only used when the fill level of the mixing drum 102 requires the use of one or more lift axles. By way of example, if the mixing drum 102 is determined to be below a minimum threshold fill level, the controller 402 may not lower the lift axles when the concrete mixer truck exceeds the threshold speed.

Additionally or alternatively, the controller 402 may be configured to limit a speed of the concrete mixer truck 10 when one or more of the lift axles are in the raised position. By way of example, the controller 402 may be configured to limit the speed of the concrete mixer truck 10 to less than a maximum threshold speed when one or more lift axles are in the raised position. This speed may be measured by the speed sensor 432.

Wheel Force

In some embodiments, the controller 402 is configured to control operation of the suspension actuators 302 and/or the axle lifters 350 to vary the weight supported by each wheel 202 and/or axle based on the fill level of the mixing drum 102 (e.g., as provided by the fill level sensor 420). Specifically, in some embodiments, the fill level sensor 420 continuously or periodically measures the fill level of the mixing drum 102, and the controller 402 continuously or periodically adjusts the suspension actuators 302 and/or the axle lifters 350 to compensate for changes in suspension As the amount of material in the mixing drum 102 increases, the gross weight of the concrete mixer truck 10 increases, and thus the weight supported by each axle also increases. Similarly, as the amount of material in the mixing drum 102 decreases (e.g., concrete is dispensed), the gross weight of the concrete mixer truck 10 decreases, and thus the weight supported by each axle also decreases. If these changes in gross weight are not accounted for by the controller 402 (e.g., by adjusting the suspension actuators 302 and/or the axle lifters 350), the concrete mixer truck may experience a variety of undesirable effects, such as an uneven distribution of weight across the axles and/or an unintended change in ride height or body posture (e.g., pitch, roll, etc.).

In some embodiments, the controller 402 is configured to control the suspension actuators 302 and/or the axle lifters 350 to maintain an approximately even distribution of weight across each of the axles. As the suspension actuators 302 and/or the axle lifters 350 are adjusted to increase the weight supported by one axle, the weight supported by the other axles decreases. As the fill level of the mixing drum 102 increases, the weight supported by each axle generally increases. Due to the varying distances between the mixing drum 102 and the axles, a change in the fill level of the mixing drum 102 affects the weight supported by each axle differently (e.g., a change in weight of the material in the mixing drum 102 may affect axles closer to the mixing drum (e.g., the tandem axles) more severely than the axles that are positioned farther from the mixing drum 102 (e.g., the front axle 210)). Accordingly, the controller 402 may be configured to adjust the suspension actuators 302 and/or the axle lifters 350 as the fill level of the mixing drum 102 changes in order to maintain an approximately even distribution of weight across the axles.

In some embodiments, a relationship between the fill level of the mixing drum 102 and a weight supported by each axle and/or wheel 202 when the weight is evenly distributed across the axles is predetermined and stored in the memory 406. By way of example, a mathematical force balance and/or moment balance may be performed to develop an equation that relates the fill level of the mixing drum 102 to the weight supported by each wheel 202 and/or axle. As the concrete mixer truck 10, the mixing drum 102 may continuously rotate, and the fill level sensor 420 may continuously or periodically determine the fill level of the mixing drum. Based on the fill level and the predetermined relationship, the controller 402 may determine a target weight for each axle and/or wheel 202 to support. The controller 402 may control the suspension actuators 302 and/or the axle lifters 350 to reach this target weight for each axle. In some embodiments, the wheel force sensors 308 may be used to provide feedback for closed loop control.

Throughout operation, the lift axles may be moved between the raised positions and the lowered positions, varying the weight supported by each axle. When this occurs, the controller 402 may be configured to control the suspension actuators 302 and/or the axle lifters 350 to provide a relatively even weight distribution across each axle. The predetermined relationship between the fill level of the drum 102 and the weight supported by each axle may differ based on which lift axles are in the lowered positions. By way of example, the controller 402 may utilize a different predetermined relationship for each lift axle configuration of the concrete mixer truck (e.g., only the pusher axle 240 lowered, only the tag axle 250 lowered, both the pusher axle 240 and the tag axle 250 lowered, neither lift axle lowered, etc.).

While the axle forces are adjusted, the position of one or more of the wheels 202 may vary relative to the frame 12. This may undesirably change the ride height of the concrete mixer truck 10 and/or the posture of the frame 12. To reduce these effects, the controller 402 may control the suspension actuators 302 and/or the axle lifters 350 based on inputs from the wheel position sensors 309 to maintain a target height range of each wheel 202. In some embodiments, the controller 402 is configured to mitigate long term changes in wheel position while minimally affecting short term changes in wheel position (e.g., caused by encountering a bump).

Tire Pressure

In some embodiments, the controller 402 is configured to control the CTI system 330 to vary the tire pressure of the wheels 202 based on the fill level of the mixing drum 102 (e.g., as provided by the fill level sensor 420). In some embodiments, the controller 402 increases the tire pressure as the fill level increases. In some embodiments, the controller 402 decreases the tire pressure as the fill level increases. In some embodiments, the controller 402 maintains a target tire pressure as the fill level is varied.

Axle Articulation

In some embodiments, the controller 402 is configured to control the locks 306 to selectively prevent articulation of one or more axles based on the fill level of the mixing drum 102 (e.g., as provided by the fill level sensor 420). In some embodiments, the controller 402 is configured to selectively engage one or more of the locks 306 to prevent articulation based on the fill level of the mixing drum being above or below a threshold fill level. By way of example, when the mixing drum 102 is filled, the center of gravity of the gross weight of the concrete mixer truck 10 may be elevated, decreasing the stability of the concrete mixer truck when turning. In such a situation, it may be advantageous to limit (e.g., prevent) articulation of the axles to limit body roll when turning, thereby reducing the likelihood that the center of gravity would move laterally beyond the wheels 202, causing the concrete mixer truck 10 to tip. Accordingly, in some embodiments, the controller 402 is configured to engage one or more of the locks 306 to limit articulation of one or more axles when the fill level is above a threshold fill level. The controller 402 may constantly engage the locks 306, or the controller 402 may engage the locks 306 only when the concrete mixer truck 10 is turning.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the concrete mixer truck 10 as shown in the various exemplary embodiments is illustrative only. Additionally, any element disclosed in one embodiment may be incorporated or utilized with any other embodiment disclosed herein. For example, the tag axle 250 of the exemplary embodiment shown in at least FIG. 1 may be incorporated in the concrete mixer truck 10 of the exemplary embodiment shown in at least FIG. 3. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A vehicle, comprising:
a chassis;
a mixing drum rotatably coupled to the chassis;
a fill level sensor configured to provide a signal indicative of a fill level of a material within the mixing drum;
an axle assembly coupled to the chassis and including a first tractive element;
a suspension actuator coupled to the axle assembly and configured to apply a biasing force that forces the first tractive element into engagement with a ground surface;
a lift axle coupled to the chassis and including a second tractive element;
a lift actuator coupled to the lift axle;
a location sensor configured to provide location data indicating a location of the vehicle; and
a controller operatively coupled to the fill level sensor, the suspension actuator, the lift actuator, and the location sensor and configured to:
calculate a target weight to be supported by the first tractive element;
control the suspension actuator to vary the biasing force based on the fill level of the material within the mixing drum and the target weight; and
control the lift actuator to reposition the lift axle based on the location data.

2. The vehicle of claim 1, wherein the controller is configured to determine the fill level based on an angular orientation of the mixing drum when the fill level sensor comes into contact with the material.

3. The vehicle of claim 1, wherein the controller is configured to control the lift actuator to reposition the lift axle into a lowered position in response to the fill level exceeding a threshold fill level.

4. The vehicle of claim 1, wherein the controller is configured to control a central tire inflation (CTI) system to vary a tire pressure of the first tractive element based on the fill level.

5. The vehicle of claim 1, wherein the suspension actuator includes an air bag coupled to the axle assembly and the chassis and containing a compressed gas.

6. The vehicle of claim 5, wherein the suspension actuator is configured to vary the biasing force by introducing additional gas into the air bag.

7. The vehicle of claim 1, wherein the axle assembly is a rear axle assembly, further comprising a front axle assembly coupled to the chassis and positioned forward of the rear axle assembly.

8. The vehicle of claim 1, wherein the axle assembly is a front axle assembly, further comprising a rear axle assembly coupled to the chassis and positioned rearward of the front axle assembly.

9. The vehicle of claim 1, wherein the controller is configured to control the suspension actuator to increase the biasing force from a first magnitude to a second magnitude in response to a first increase in the fill level of the material within the mixing drum, and wherein the controller is configured to increase the biasing force from the second magnitude to a third magnitude in response to a second increase in the fill level of the material within the mixing drum.

10. The vehicle of claim 1, further comprising a wheel force sensor configured to provide a signal indicative of a weight supported by the first tractive element, and wherein the controller is configured to control the suspension actuator to vary the biasing force based on the target weight and the signal from the wheel force sensor.

11. The vehicle of claim 10, wherein the wheel force sensor is configured to measure a pressure of a fluid within the suspension actuator.

\* \* \* \* \*